(12) United States Patent
Leonhard et al.

(10) Patent No.: US 10,024,483 B2
(45) Date of Patent: Jul. 17, 2018

(54) MACHINE ENCLOSURE

(71) Applicant: SOUTHWESTERN INDUSTRIES, INC., Rancho Dominguez, CA (US)

(72) Inventors: Richard Wright Leonhard, Rolling Hills, CA (US); Tadeusz A. Olewicz, Stanton, CA (US)

(73) Assignee: Southwestern Industries, Inc., Rancho Dominiguez, CA (US)

( * ) Notice: Subject to any disclaimer, the term of this patent is extended or adjusted under 35 U.S.C. 154(b) by 48 days.

(21) Appl. No.: 15/272,115

(22) Filed: Sep. 21, 2016

(65) Prior Publication Data
US 2017/0087682 A1    Mar. 30, 2017

Related U.S. Application Data
(60) Provisional application No. 62/284,303, filed on Sep. 25, 2015.

(51) Int. Cl.
B23Q 11/08 (2006.01)
F16M 1/00 (2006.01)
B23Q 37/00 (2006.01)

(52) U.S. Cl.
CPC ........... *F16M 1/00* (2013.01); *B23Q 11/0891* (2013.01); *B23Q 37/005* (2013.01); *Y10S 901/49* (2013.01)

(58) Field of Classification Search
CPC ........ Y10T 409/30392; B23Q 11/0891; B23Q 11/08; B23Q 11/0825
See application file for complete search history.

(56) References Cited

U.S. PATENT DOCUMENTS

| | | | |
|---|---|---|---|
| 3,392,497 | A | 7/1968 | Vantine |
| 3,885,362 | A | 5/1975 | Pollock |
| 4,597,698 | A | 7/1986 | Liebetrau |
| 4,677,718 | A | 7/1987 | Babel |
| 5,178,499 | A | 1/1993 | Umeda et al. |
| 5,181,898 | A | 1/1993 | Piotrowski |
| 5,779,354 | A | 7/1998 | Targetti |
| 5,863,163 | A | 1/1999 | Wehler et al. |
| 5,897,430 | A | 4/1999 | Haller |
| 5,929,394 | A | 7/1999 | Westerbeke, Jr. |
| 6,364,582 | B1 | 4/2002 | Hoppe et al. |
| 6,568,885 | B2 | 5/2003 | Green |
| 6,662,685 | B2 | 12/2003 | Kuriki et al. |

(Continued)

FOREIGN PATENT DOCUMENTS

| CN | 104117857 A | 10/2014 |
|---|---|---|
| CN | 102848321 B | 4/2015 |

(Continued)

OTHER PUBLICATIONS

Search Report for GB 1616157.2, dated Feb. 15, 2017.

*Primary Examiner* — Bradley Duckworth
(74) *Attorney, Agent, or Firm* — Womble Bond Dickinson (US) LLP

(57) ABSTRACT

An enclosure for machine tools, such as a CNC machine, is provided. The transformable enclosure may include a series of modules or panels movable between a series of open and closed positions to allow an operator increased control over the production of a particular part and allowing parts of various shapes and dimensions to be machined without the need to switch between multiple machines.

20 Claims, 15 Drawing Sheets

(56) References Cited

U.S. PATENT DOCUMENTS

| | | |
|---|---|---|
| 6,733,371 B2 | 5/2004 | Giebmanns |
| 7,226,403 B2 | 6/2007 | Konvicka et al. |
| 7,766,728 B2 | 8/2010 | Williamson et al. |
| 7,910,845 B2 | 3/2011 | Kozar et al. |
| 8,006,727 B1 | 8/2011 | Urban et al. |
| 8,601,906 B2 | 12/2013 | Nishi et al. |
| 8,715,038 B2 | 5/2014 | Cheon |
| 9,366,385 B2 * | 6/2016 | Ishihara .................... F16P 3/02 |
| 9,457,444 B2 * | 10/2016 | Asano ................ B23Q 11/0053 |
| 9,566,680 B2 * | 2/2017 | Inaguchi ............ B23Q 11/0042 |
| 2009/0099680 A1 | 4/2009 | Usui |
| 2012/0073215 A1 | 3/2012 | Zhang et al. |
| 2012/0220211 A1 | 8/2012 | Osicki |
| 2014/0079509 A1 | 3/2014 | Chalverat |
| 2014/0130422 A1 | 5/2014 | Laing et al. |
| 2014/0373673 A1 * | 12/2014 | Nagao ................ B23Q 11/0825 74/608 |
| 2015/0252604 A1 | 9/2015 | Inaguchi |

FOREIGN PATENT DOCUMENTS

| | | |
|---|---|---|
| CN | 204725231 U | 10/2015 |
| DE | 3513944 C2 | 8/1987 |
| DE | 3635900 A1 | 5/1988 |
| WO | WO 2001-038044 A1 | 5/2001 |

\* cited by examiner

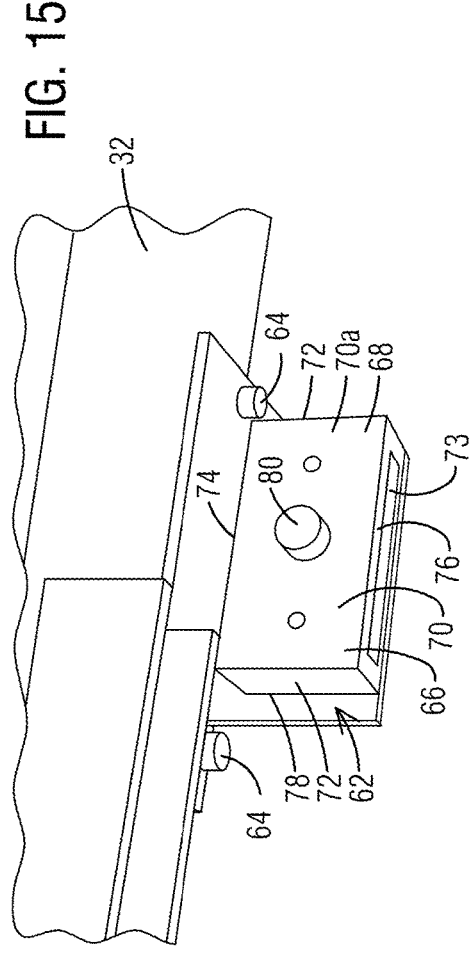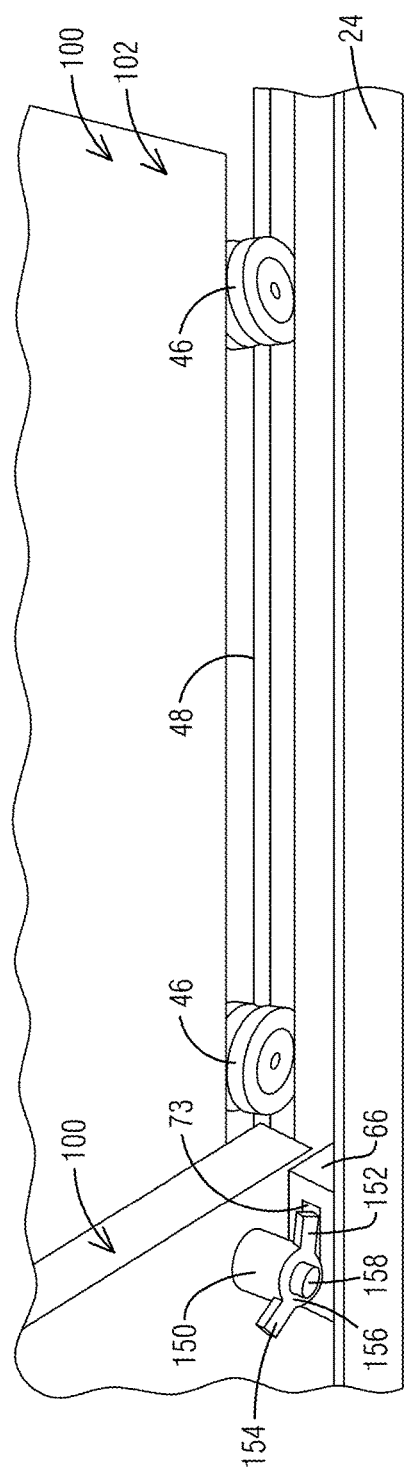

MACHINE ENCLOSURE

CROSS REFERENCE TO RELATED APPLICATIONS

The present patent application is a formalization of previously filed, co-pending U.S. Provisional Patent Application Ser. No. 62/284,303, filed Sep. 25, 2015 by the inventors named in the present application.

INCORPORATION BY REFERENCE

The specification and drawings of the U.S. Provisional Patent Application Ser. No. 62/284,303, filed Sep. 25, 2015 are specifically incorporated herein by reference as if fully set forth in their entirety.

TECHNICAL FIELD

The present disclosure generally relates to transformable enclosures for enclosure of machine tool equipment and/or machining equipment and facilities.

BACKGROUND

Automated machining centers or machine tools, such as Computer Numeric Control (CNC) machines, generally are provided with protective enclosures and/or cabinets with doors or guards used to enclose the machines and parts being made thereon during their operation to protect operators from debris and operating tools. During machining operations such milling, turning, drilling or other type of material cutting or similar operations, there often are occasions where only a single part or a small number of parts needs to be made, such as before a production run or for small orders of parts, and/or instances where more intricate or delicate parts are being made that may require operators to have more hands-on control while making such parts, thus often requiring easy or greater access to and around the workpiece; therefore machines without enclosures, or partial enclosures often can be preferred and/or be necessary in such situations. In addition, there are also instances where parts may be longer or wider and do not fit inside a typical machine enclosure, and thus will need to be machined on another machine without a protective enclosure Therefore, there are instances that may require the operator to have access or availability of at least two different machines and/or switch back and forth between these machines in order to manufacture a part or component. Accordingly, it can be seen that a need exists for type of machine tool enclosure that addresses the foregoing, by providing operators with the ability to efficiently transform the machine tool enclosure, such as from a fully closed production configuration to fully opened configuration for more hands-on, intimate control of part machining operations, and for allowing parts of varying dimensions/sizes to be machined on a single machine.

SUMMARY

Briefly described, the present disclosure is directed to a transformable enclosure that can be selectively configured, expanded, adjusted and/or re-configured as needed for enclosing automated machine tool equipment, and which is constructed to enable easy and efficient transformation from an enclosed machine tool/machining center, to an open machine tool/machining center arrangement of a selected size and configuration, as needed, in a practical, quick and efficient manner. The transformable enclosure thus can provide greater flexibility in making parts, including parts of varying sizes and/or parts that may require multiple and/or different tools using a single machine, machining center or related equipment.

In one embodiment, the transformable enclosure can include a frame comprising a series of beams or supports mounted/coupled together to define a stable, substantially fixed enclosure structure, with front, rear, side and top portions or sections defining an interior or chamber of the enclosure within which the tooling machine is at least partially received or enclosed. One or more openings or apertures also can be defined within or between the sections for providing access to the interior of the enclosure housing an automated machine tool, such as a Computerized Numeric Control (CNC) machine. The transformable enclosure may further include a series of modules, including panels of varying sizes and/or configurations, at least some of which may be movable with respect to each other between a series of positions providing varying levels of access to the interior of the machine enclosure, and closed positions, including closing off the interior and preventing particulates or debris formed from operation of the machine, and/or lubricants or coolants used during the machining process, from escaping or leaking into the surrounding environment.

In general, the frame supports or beams will at least partially support the modules or panels in a manner so that movement of at least some of the modules can be directed or guided along the beams. In additional embodiments, at least some of the frame supports can be fixedly connected, while additional ones of the frame supports further can be slidably or rotatably connected so as to be movable as needed, and/or can be formed with an expandable or telescoping construction, wherein various ones of the beams can be slidably received within, or otherwise movable in relation to, others of the beams, thus providing for expansion and contraction of the frame between a series of variable configurations or arrangements. Movement (i.e., expansion and/or contraction) of the beams and/or the panels can be controlled and driven by one or more motors, or manually by an operator. Locking mechanisms also can be provided to secure/couple the panels and/or the beams in their desired or selected positions/locations to securely form/define a stable enclosure having a desired size and/or configuration.

The enclosure thus can be configured with a series of varying location, size, and/or configuration openings for enabling variable access to the machine tools and/or viewing of the machine during operation and thereby provide the operator more intimate, hands-on control over work on a particular part or parts and/or allow the operator to quickly and efficiently machine parts of variable designs, sizes and dimensions without the need to switch between multiple machines.

Various objects, features and advantages of the present invention will become apparent to those skilled in the art upon a review of the following detail description, when taken in conjunction with the accompanying drawings.

BRIEF DESCRIPTION OF THE DRAWINGS

FIG. 15 is a partial view of a stop mechanism according to principles of this disclosure.

FIG. 16 is a partial view of the roller assemblies according to principles of this disclosure.

Figure 1:
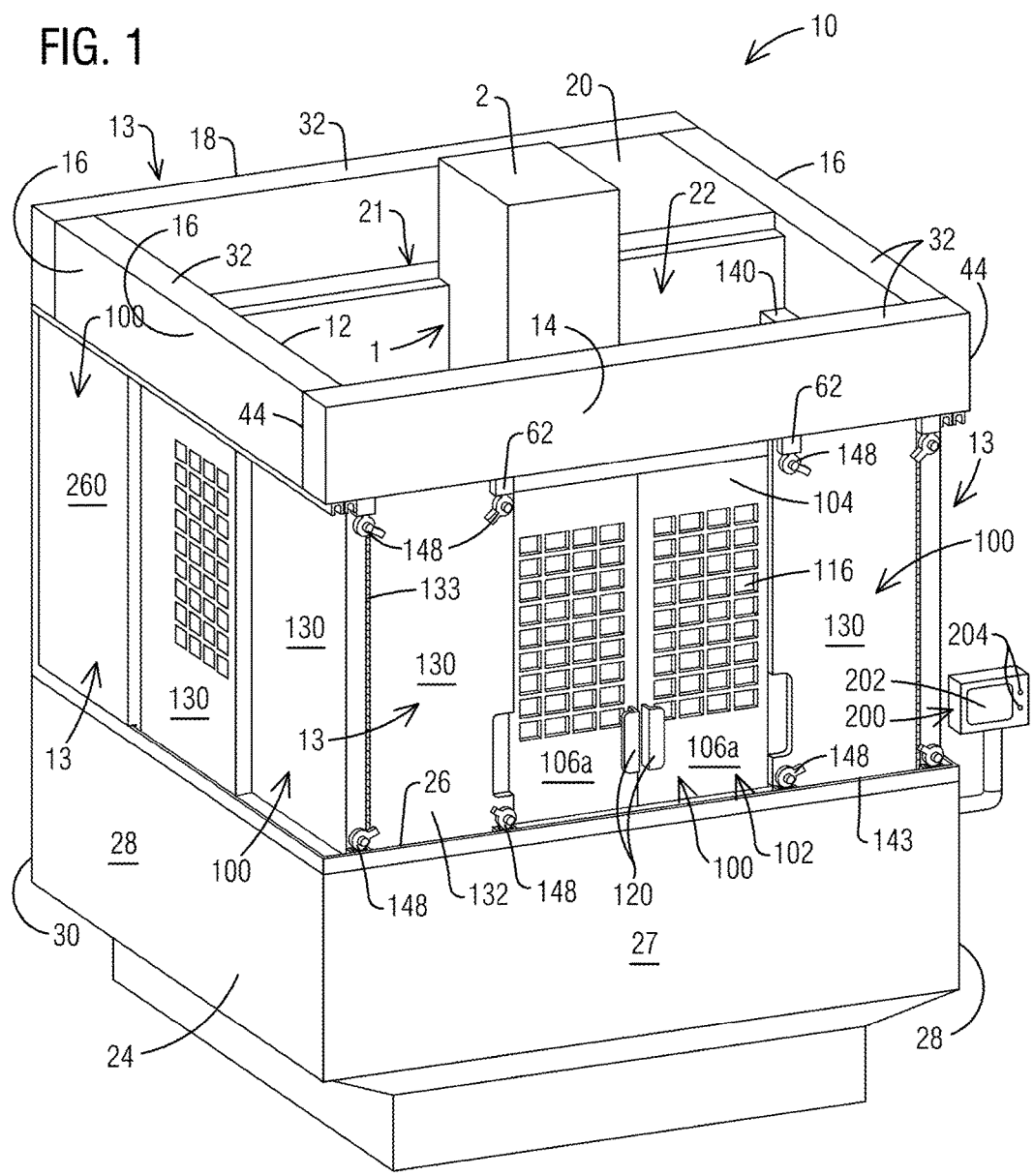
FIG. 1 is a perspective view of the transformable enclosure according to principles of the present disclosure, with the panels or modules in a closed position.

Those skilled in the art will appreciate and understand that, according to common practice, the various features of the drawings discussed below are not necessarily drawn to scale, and that the dimensions of various features and elements of the drawings may be expanded or reduced to more clearly illustrate the embodiments of the present invention described herein.

DETAILED DESCRIPTION

Referring now to the drawings in which like numerals indicate like parts throughout the several views, the present application is generally directed to a transformable enclosure 10 for enclosing an automated machine tool 1, which is movable between a series of opened and closed positions to provide an operator increased or more intimate, hands-on control over the machining of a particular part and/or to allow the operator to machine parts of different sizes or dimensions without the need to transfer one or more parts back and forth between multiple machines. Such a transformable enclosure can be manufactured as part of a new automated machine tool enclosure or may be incorporated into an existing automated machine tool by building the enclosure around the automated machine tool and/or modifying the existing enclosure of the automated machine tool.

As shown in FIGS. 1-17, embodiments of the present application may provide a transformable enclosure 10 with an enclosure frame 12 that can comprise a series of movable/adjustable portions or sections 13, which can be arranged and securely coupled in a variety of configurations at least partially defining, surrounding or enclosing an interior space 22 or enclosure area/chamber of a selected size, and/or which can be designed for housing machine tools/components of various type, size and/or configuration automated tooling equipment or machines 1. These sections or portions 13 each generally can be formed with, or can be expandable to selected dimensions for forming desired size/configuration enclosures, and can further have a series of panels, modules, doors, gates or similar features 100 that can be moved to open or close one or more apertures or openings 23 (FIGS. 2-3), through which varying levels of access to the interior 22 of the enclosure 10 and the various machining tools/components housed therein can be provided. For example, as indicated in FIGS. 1-12, the panels 100 of the sections or portions 13 can be arranged, dimensioned or configured to have a sufficient height to prevent chips, debris, or other particulates developed from, and/or coolants or lubricants used during, the operation of the machine from escaping or leaking out of the transformable enclosure into the surrounding environment during use of the machine, and to form or define a series of barriers, walls or dividers, which allow an operator to work more closely with, or have increased control over, machining of one or more parts or runs of parts and allow for parts of various/different shape, dimensions, sizes, or configurations to be worked, machined or fabricated on a single machine, while at the same time providing sufficient protection to the operator, and surrounding environment, from the machine's tools/components and/or the chips, debris, or other particulates generated by the machine.

In one embodiment, the sections or portions 13 may include front 14, side 16, rear 18, and a top 20 section at least partially defining a series of barriers, walls or dividers around the various sides of the interior 22 and the machine tools/components disposed therein, such as being arranged in a square or rectangular shape, or other arrangement or configuration. Embodiments of the present disclosure are not limited to particular shapes, arrangements or configurations, however, and the various sections or portions may take, or be formed in, any shape, arrangement or configuration, such as L-shaped, straight, polygonal, oval, circular and/or other shapes, arrangements, or configurations, or any combination thereof, that provides an enclosed area sufficient to protect an operator from, or prevent escape/exposure of debris, chips, or other particulates formed, and/or lubricants or coolants used, during operation of the machine.

The sections 13 of the enclosure frame 12 further may comprise a series of movable modules or panels 100 and movable or reconfigurable frame supports or beams 32, which are extendable and adjustable/reconfigurable between a series of positions or configurations for forming the prescribed/desired size or configuration enclosures and at least partially supporting a series of modules 100 disposed along the frame of the enclosure as generally shown in FIGS. 1-12. The modules 100 may be movable or slidable in forward and rearward motions along the frame 12, as well as pivoting or rotating, so as to be movable between a series of open positions to provide varying degrees of access to the interior 22 (FIGS. 2-6 and 8-12) of the enclosure, and a series of closed positions (FIGS. 1 and 7) at least partially closing off various sides of the transformable enclosure. The modules 100 may be at least partially supported by the supports/beams 32 and movable therealong or thereabout. The supports or beams 32 may be selectively connected and/or reconfigurable to at least partially define the frame 12, and allow the frame 12 to be formed with various shapes, dimensions, arrangements, and/or configurations to accommodate different automated machine tools or other automated machines.

According to embodiments of the present disclosure, the automated machine tool 1 can include a Computer/Computerized Numeric Control (CNC) machine or other automated or powered tooling machine or equipment. The automated machine tool also may have one or more machining heads 2 or other tools movable in vertical, lateral, and transverse directions for cutting, milling or machining different parts or materials. For example, machine tools can include mills, drills, lathes, plasma cutters, electric discharge machines, water jet cutters, laser cutters, 3-D printers, grinders, or any other machining tools or apparatuses. Further, in some embodiments, the top section 20, and/or other sections, of the transformable enclosure also can include an adjustable opening or aperture 21, whereby one or more machining heads 2 or other tools can extend and freely move therethrough in the vertical and potentially transverse directions during a machining operation. Though the present application is not limited solely to this arrangement, however, and the front 14, side 16, and rear 18 sections may have a height sufficient such that the top section 20 is disposed above all components of the automated machine tool. Further, one or more covers (not shown) may be employed to enclose or cover opening 21, which may include retractable and/or expandable portions configured to cover opening 21 and any protruding tools or other components of the machine 1.

Figure 2:
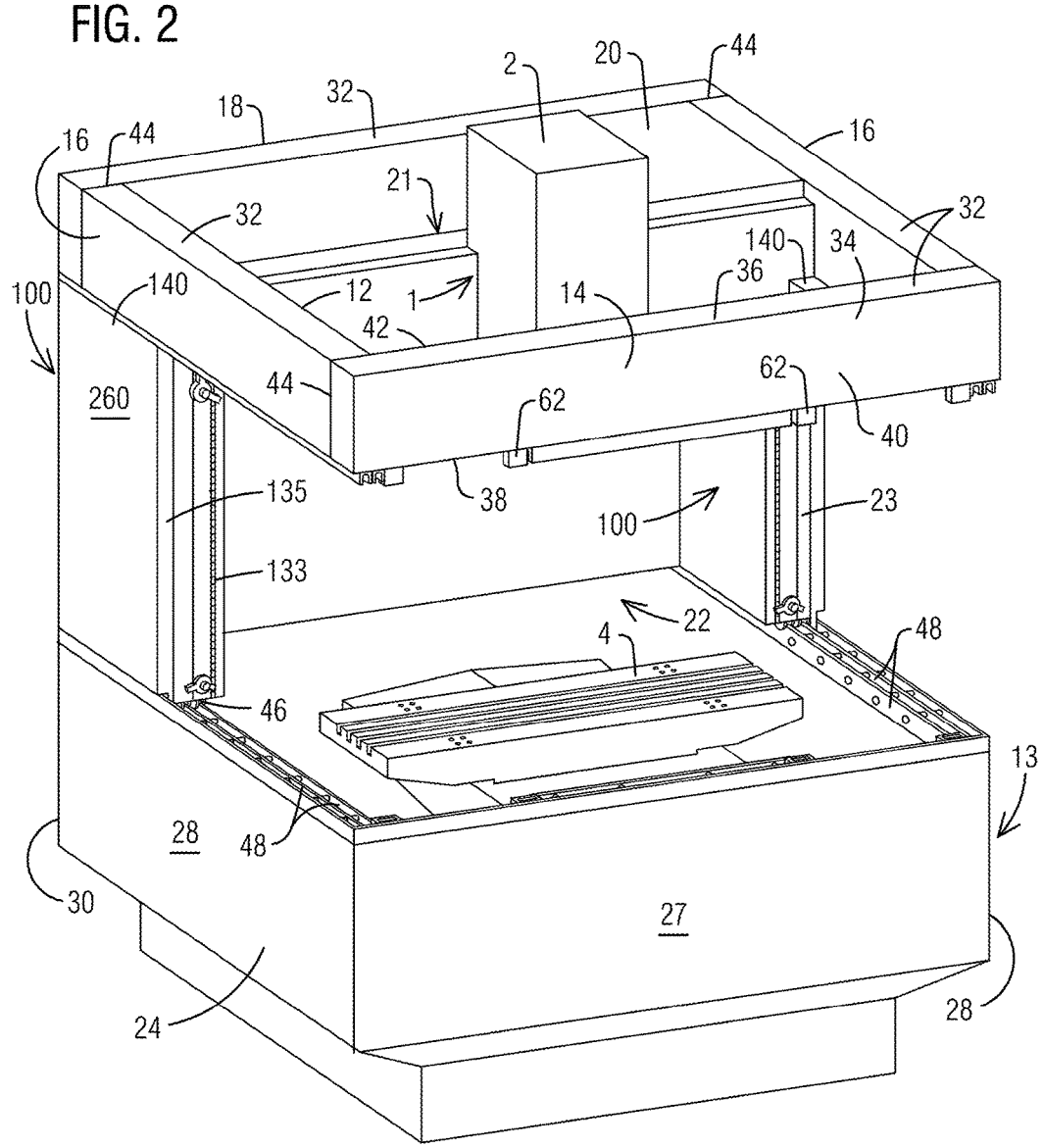
FIG. 2 is a perspective view of the transformable enclosure of FIG. 1, with the panels or modules in an open position.

As shown in FIGS. 2-12, the automated machine tool 1 generally can include a worktable 4 configured to hold or at least partially support the part or parts being worked on or machined by the machining head 2, which may itself be movable/adjustable in the lateral, transverse, and vertical directions. The machining head 1 also can be disposed on and/or at least partially supported by a base 24 of the automated machine tool 1 (FIG. 2). Such a base 24 can include a body 26 with front 27, side 28, and rear 30 portions or sections (FIG. 1), which may be formed of a high strength, durable material, such as cast iron or any other metal, composite or material suitable for use with automated machine tools.

The automated tooling machine 1 may further include one or more cooling or lubrication assemblies (not shown), which generally may include one or more hose and nozzle assemblies for providing a coolant and/or lubricant during operation of the machine to reduce heat generated thereby or to lubricate the part or various parts during machining. The operation of the cooling and/or lubrication assemblies, e.g., the flow or rate of flow of coolants or lubricants, may be increased, decreased, or deactivated on the basis of the positions, arrangements, or configurations of the frame supports and/or modules, and may further be controlled by one or more controllers, processors, or computers (CPUs). For example, when the modules 100 are in one of a series of open positions, the cooling or lubrication assemblies may be caused to be deactivated, so that no coolant or lubricant is expelled from these assemblies, or the flow of coolant or lubricant stopped to prevent coolant and/or lubricant from escaping/leaking into the environment surrounding the transformable enclosure through the one or more openings. Each of the frame supports/beams 32 and/or modules 100 may additionally include a series of seals or gaskets, e.g., rubber seals or gaskets, compatible with the cooling or lubricant, e.g., not susceptible to corrosion caused by the lubricants or coolants, disposed thereon to provide sealing between the various frame supports or beams 32 and/or modules 100 to prevent the coolant or lubricant from escaping from the transformable enclosure 10 into the surrounding environment and to further prevent chips, particulates, or debris formed during operation from getting between or infiltrating the frame supports 32, modules 100 and/or other components or parts connected thereto, which may prevent or inhibit movement of the frame supports/beams 32 or modules 100.

Figure 3:
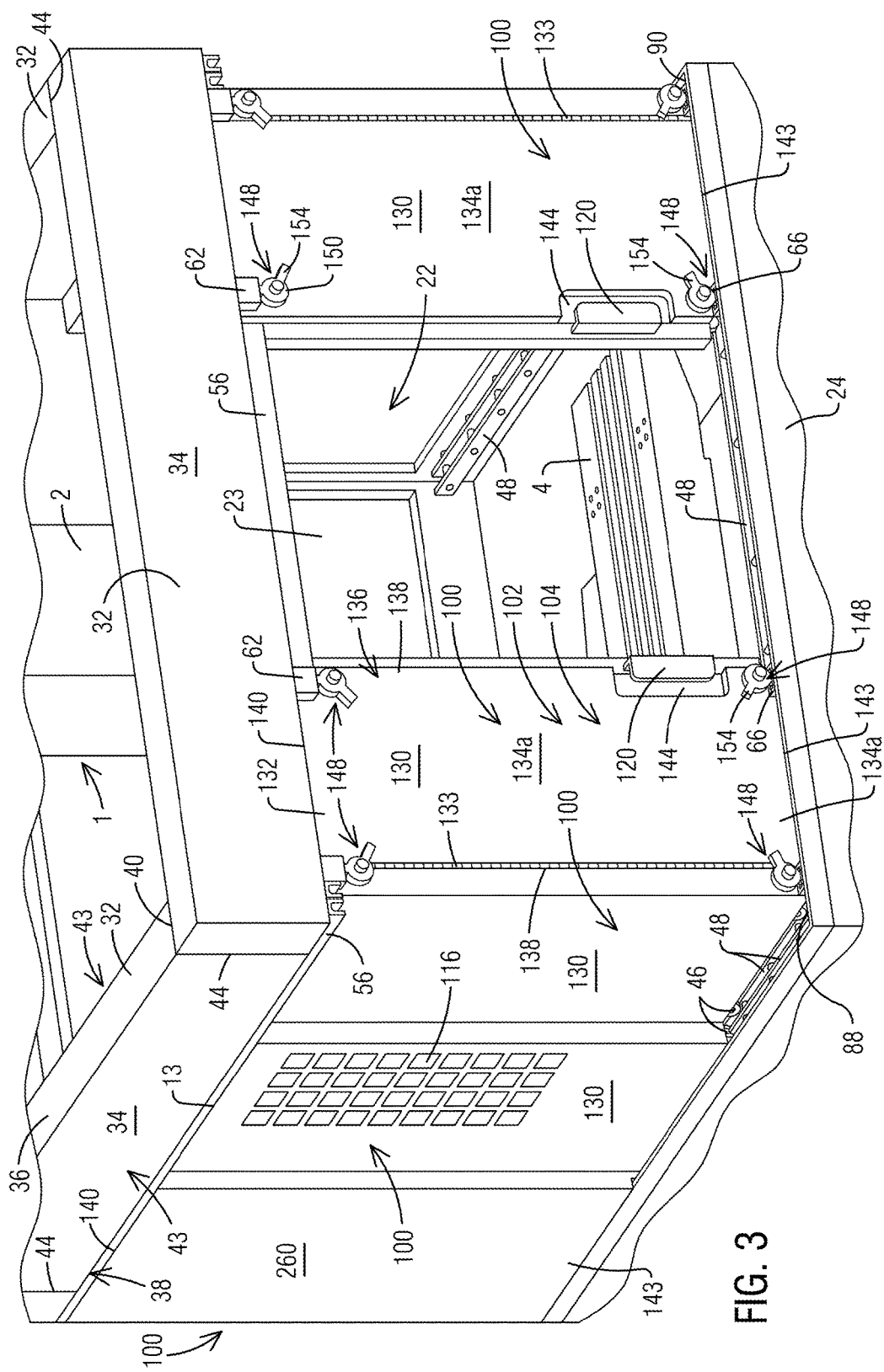
FIG. 3 is a perspective view of the transformable enclosure of FIG. 1, with the panels or modules of the door assemblies in an open position.

The automated machine tool 1 further may include a control panel 200 with one or more displays 202 and a series of buttons, levelers, knobs, or other inputs 204 to allow a user to operate automated machine tool 1, such as initiate one or more of a series of machine processes, operate the machine tools, move or adjust the machining head(s) 2 or work table, and/or activate hoses and/or nozzles to release lubricants or coolants during the machining process (FIG. 1). The display(s) 202 can also be a touch screen, without departing from this disclosure. As FIGS. 1-12 generally illustrate, the enclosure frame 12 generally includes a series of frame supports or beams 32, which may be movable/reconfigurable between various positions and/or configurations and at least partially support modules 100 so that the modules 100 are slidable, rotatable and/or otherwise movable in one or more directions of movement about the frame supports or beams 32. The frame supports 32 each can include a body 34 having top 36, bottom 38, front 40, rear 42, and side 43 sections or portions (FIG. 3). By way of example, these supports 32 also may include tubular beams with a substantially square or rectangular cross-section, though the supports are not limited thereto and can include tubular beams of other shapes, such as C-beams, I-beams, and/or beams or support members of other configurations. The frame supports also generally will be made of a high-strength, substantially rigid material, such as light gauge steel, though other high strength metal or composite materials also may be employed. The frame supports 32 further can be connectable together at one or more joints 44 through which adjacent supports or beams can be releasable but securely adjoined or coupled to each other to define an enclosure frame 12 of a selected size and/or configuration (FIGS. 1-12), and these joints 44 can be of different shapes, dimensions or configurations to enable coupling, or connection, of the frame supports in differing or variable positions, angles, arrangements or orientations without departing from this disclosure.

According to one aspect of the present disclosure, adjacent frame supports 32 can be fixed or otherwise connected together at joints 44 with one or more connecting members 33 coupled/fixed to a surface of the top, bottom, front or rear portions of the frame supports or beams 32, in order to define the enclosure frame/structure with a generally fixed, substantially rigid construction. In one example shown in FIG. 13, these connecting members may include one or more L-shaped flanges connected or fixed to surface 42a of the rear portions 42 of adjacent supports 32 by a series of fasteners 33a, such as screws or bolts, though these connecting members may also include plates or flanges of different shapes, dimensions or other configurations, which allow for connecting the frame supports or beams together at a series of variable positions, angles or configurations without departing from this disclosure. The fasteners 33a generally can include shank portions configured to engage with apertures, holes, or openings defined in a surface of the connection members 33 and/or frame supports or beams 32, and a head or flange portion configured to receive or otherwise communicate with one or more tools, such as a wrench or screwdriver, to allow the frame supports to be connected/coupled together quickly and efficiently in a modular manner between a series of variable positions and/or configurations, providing a variable frame which may allow for more hands-on control over fabrication of a specific part or parts, and for machining of parts with different sizes, shapes, or dimensions on a single machine. The fasteners are not limited to this construction or arrangement, however, and may include any number of releasable/detachable pins, latches, clamps, hooks, snap connectors or other fastening mechanisms that allow the frames or supports to be connected together in different positions, angles, arrangements or configurations.

Additionally, in other embodiments, the frame supports or beams 32 can define a substantially rigid enclosure frame, which further includes one or more frame supports or beams 32 coupled/attached to adjacent frame supports/beams in a manner such that they are slidable, rotatable or otherwise movable with respect to one or more of the remaining supports defining a fixed frame portion or base of the enclosure, so as to enable one or more of the enclosure sections to be expandable/contractible between a series of variable positions, arrangements or configurations. By way of example, in one aspect of the present disclosure, one or more of the frame supports/beams 32 can be movable/slidable within adjacent support/beams in a telescoping arrangement, including an arrangement with one or more frame supports or beams 32 (i.e., along a base or fixed portion of the frame such as at the rear of the enclosure) having a perimeter or circumference dimensioned, sized and/or shaped such that the supports/beams fit within larger adjacent supports or beams having a perimeter or circumference dimensioned, sized or shaped to at least partially receive a portion of the support/beams in an interior of their bodies 34, and with the supports or beams are slidable/movable in and out of the interior of the body adjacent supports or beams.

In a further alternative aspect of the present disclosure, a series of frame supports/beams 32 can be coupled/attached to define a substantially fixed or base frame of vertical and/or horizontal supports, with successive or additional ones of the supports/beams being mounted so that their positions can be adjusted by sliding in parallel movements along supporting beams, and/or rotating or other movements. By way of example, a series of wheels or rollers can be attached to the top, bottom, front or rear portions of adjacent supports, and can be at least partially received in one or more tracks or flanges mounted/attached to the top, bottom, front or rear portions of at least selected ones of the supports to allow selected ones of the beams 32 to be movable/slidable with respect to each other. Embodiments of the present application are not limited to this arrangement, however, and may additionally, or alternatively, include one or more cam/cam follower arrangements, sliding rods, slides and/or any other suitable mechanisms or arrangements attaching/connecting adjacent frame supports/beams in a movable or slidable manner.

Thus, while the present disclosure generally illustrates the formation or arrangement of the supports/beams 32 in one or more substantially fixed, stable arrangements, with modules 100 being movable therealong, the enclosure frame, or at least portions thereof, also can be adjustable as needed vary the enclosure chamber 22 defined thereby, and/or to enable greater access to the interior chamber 22 of the enclosure and the machine tool 1 therein. For example, for enabling the placement of larger size components, such as engine blocks or other heavy parts requiring a hoist or crane for movement and placement of the part within the enclosure, one or more of the supports/beams 32 along a front and/or one or more sides of the enclosure frame can be releasable and movably mounted to adjacent frame supports/beams. In such an embodiment, by way of example, such adjacent frame supports or beams 32 can be connected together at joints 44 each comprising a hinge or series of hinges so that these frame supports are rotatable with respect to one another, as well as also being slidable, sufficient to create an opening through the frame for ingress of the part carried by a hoist or lift/crane. Although the foregoing describes adjacent beams or supports connected together in releasable and/or movable arrangements, embodiments of the present application are not limited to these arrangements and adjacent supports or beams can be, additionally, or alternatively, connected together at joints 44 in a more permanent manner, e.g., by welding or other suitable connection.

Figure 9:
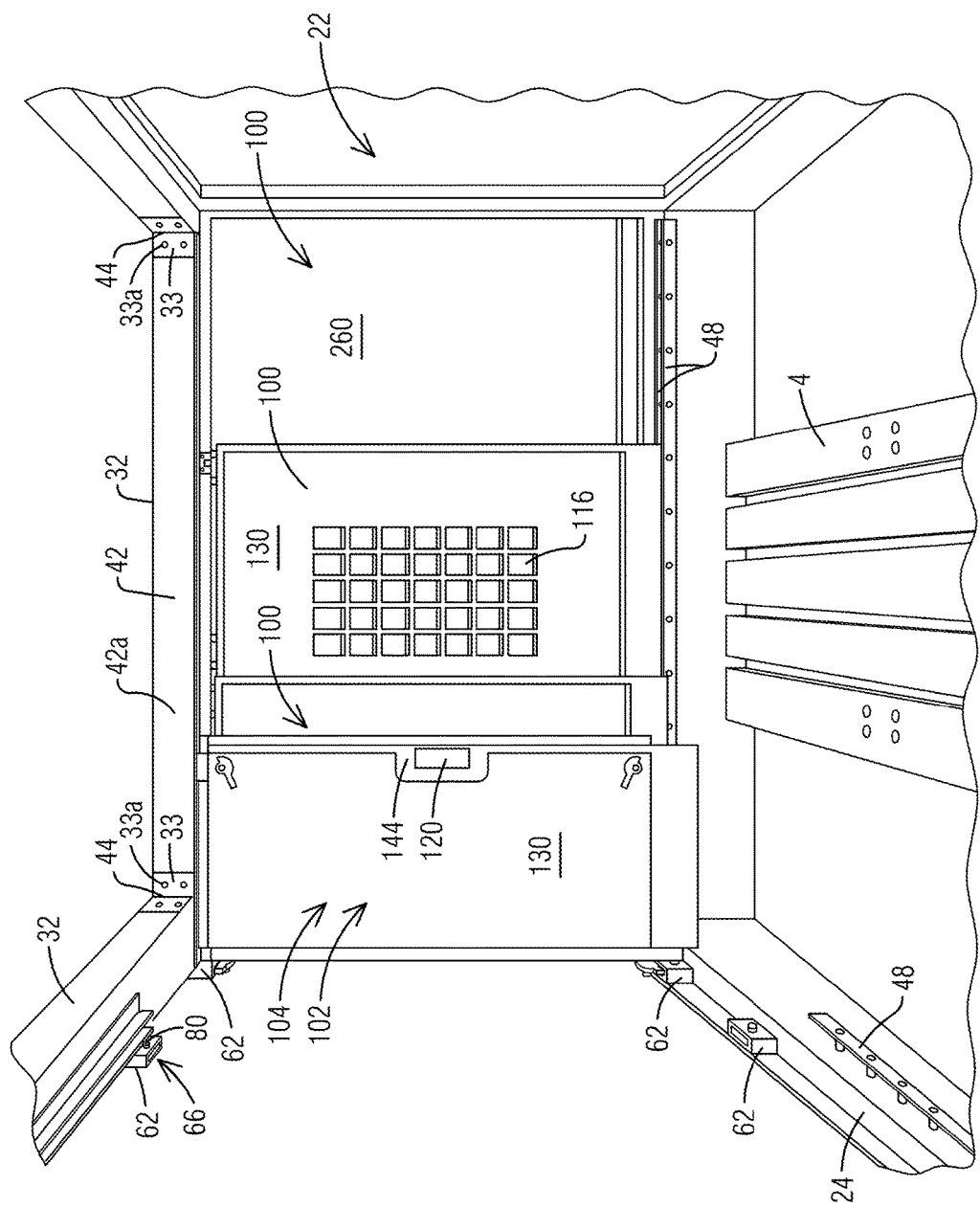
FIG. 9 is a perspective, interior view of the transformable enclosure of FIG. 1, with the panels or modules of the door assemblies and adjacent modules or panels in an open position.
Figure 10:
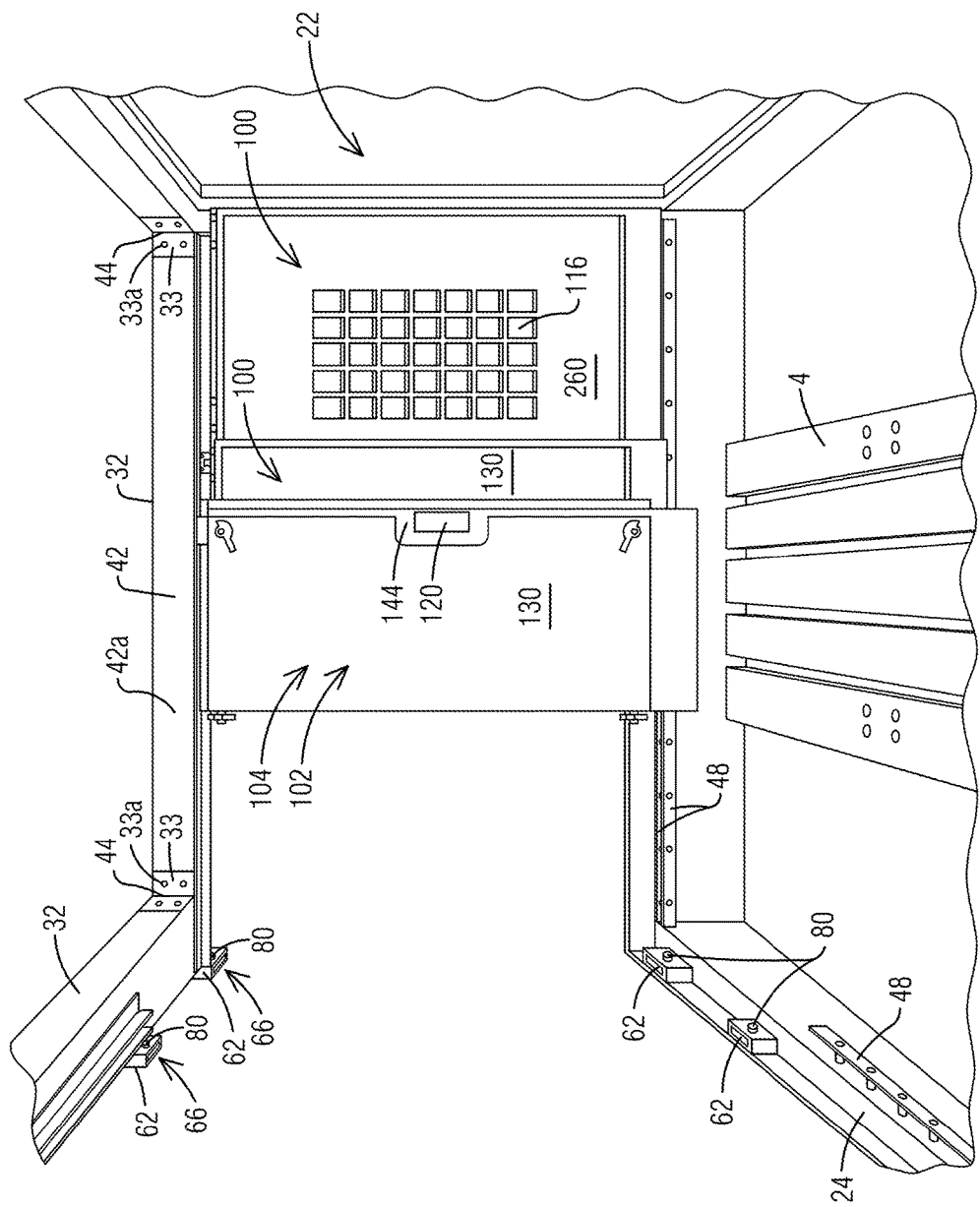
FIG. 10 is an interior, perspective view of the transformable enclosure of FIG. 1, with the panels or modules of the door assemblies and additional panels or modules in an open position.
Figure 11:
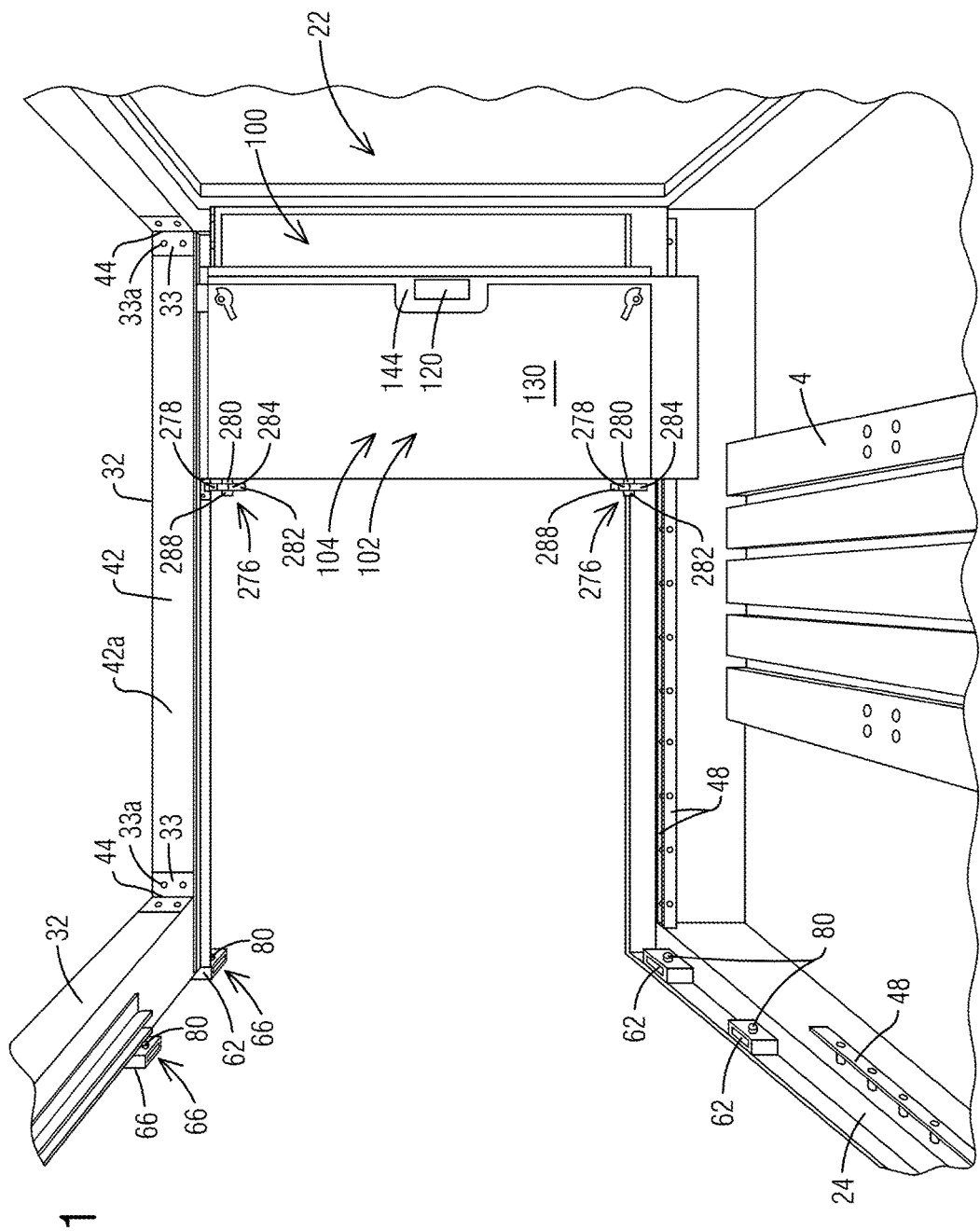
FIG. 11 is an interior, perspective view of the transformable enclosure of FIG. 1, with the panels or modules of the door assemblies and additional panels or modules in yet another open position.
Figure 12:
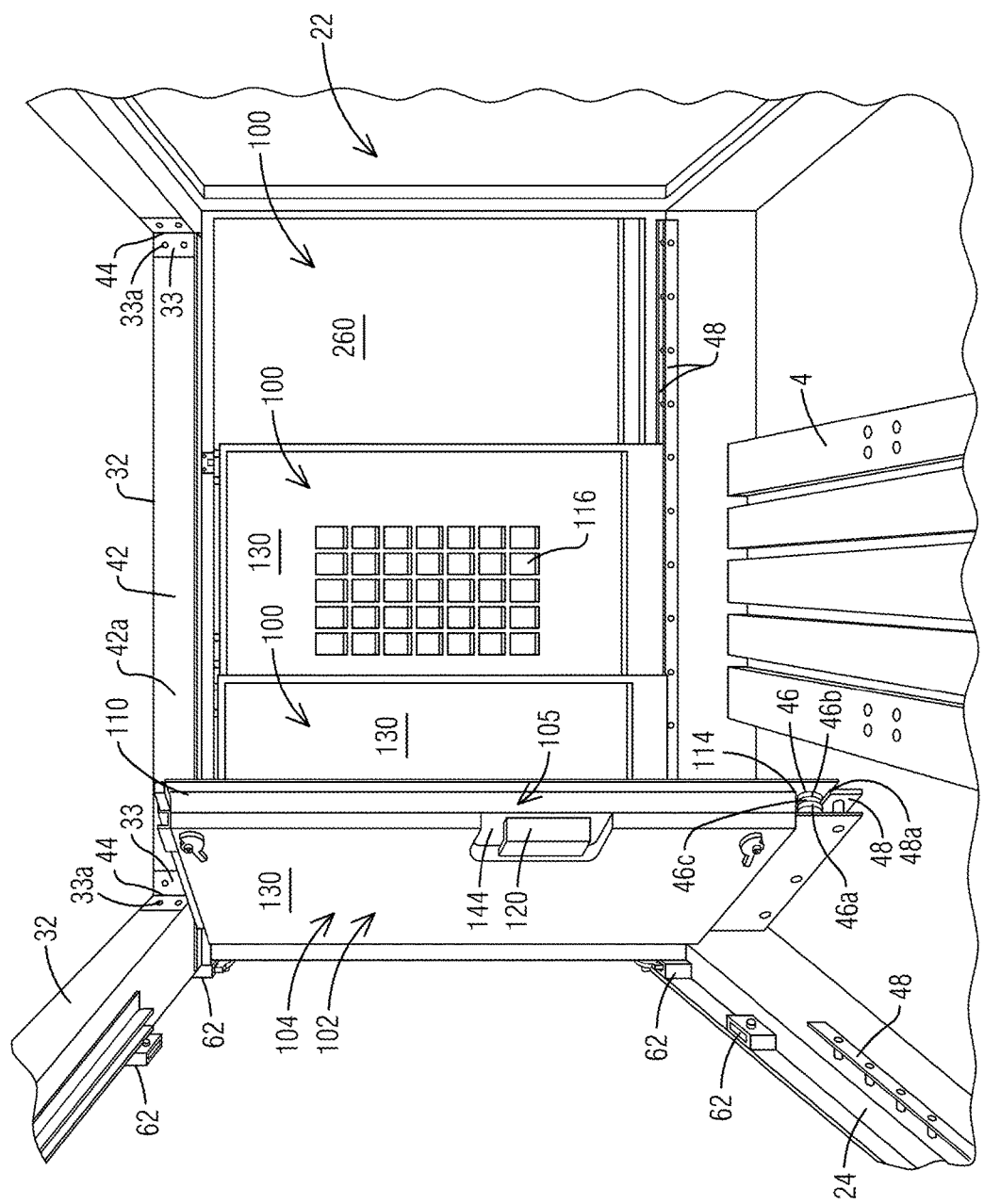
FIG. 12 is an interior, perspective view of the transformable enclosure of FIG. 1, with the panels or modules moving toward an open position.

As further illustrated in FIGS. 1-12, the transformable enclosure 10 further will include a series of modules 100 that are mounted along and at least partially supported by the frame supports or beams 32. In addition, some of the modules 100 generally can be movable along the supports or beams 32 between a series of varying positions or configurations to form or reconfigure the enclosure and provide variable access to the interior of the enclosure, thus allowing an operator to have increased control over the machining of a particular part(s) and allowing parts of different size, shapes, or dimension to be worked on/fabricated on a single machine. The modules 100 generally will be made of a high-strength, substantially rigid materials, such as light gauge steel, aluminum or carbon composite, though other materials and/or composites may be used. The modules 100 may further be mounted or movably supported on the frame supports or beams 32 such that the modules 100 are transferrable, exchangeable or movable between adjacent frame supports or beams, e.g., a module or panel which is at least partially supported by one or more of the frame supports can be movable or transferrable between one or more adjacent frame supports such that the module or panel is at least partially supported by the one or more adjacent frame supports as generally shown in FIG. 9. In another aspect of the present disclosure, the modules 100 may be at least partially supported by adjacent modules such that they are movable, slidable, rotatable in relation to adjacent modules/panels and/or also can be transferrable or exchangeable between adjacent frame supports/beams so as to define varying enclosure configurations and/or enable openings of differing sizes to be provided as illustrated in FIG. 12.

Figure 13:
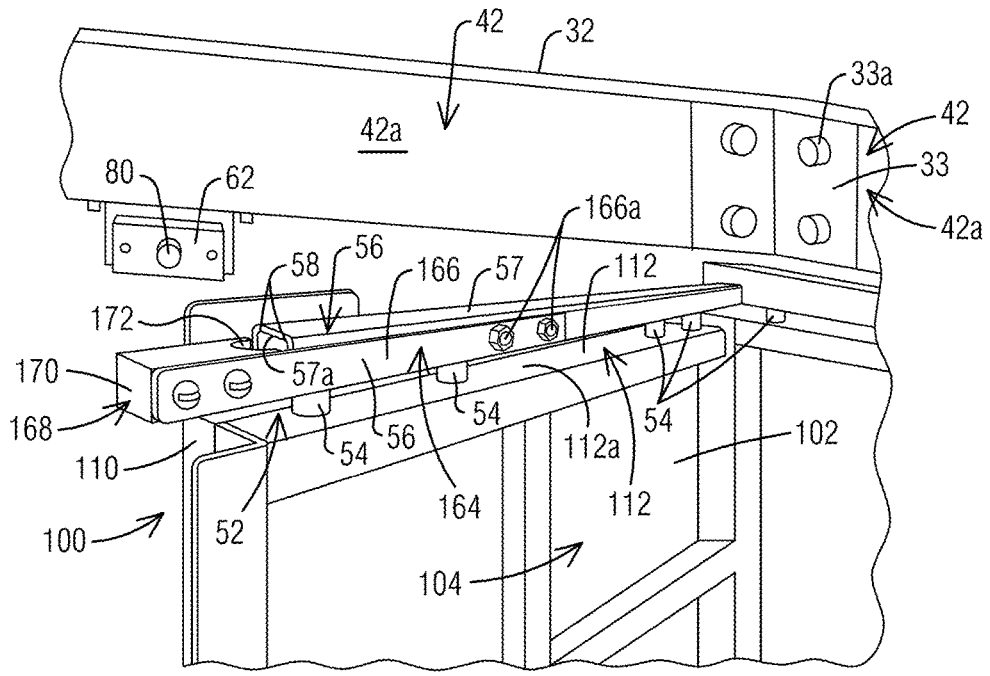
FIG. 13 is a partial view of the panels or modules moving toward an open position according to principles of this disclosure.
Figure 14:
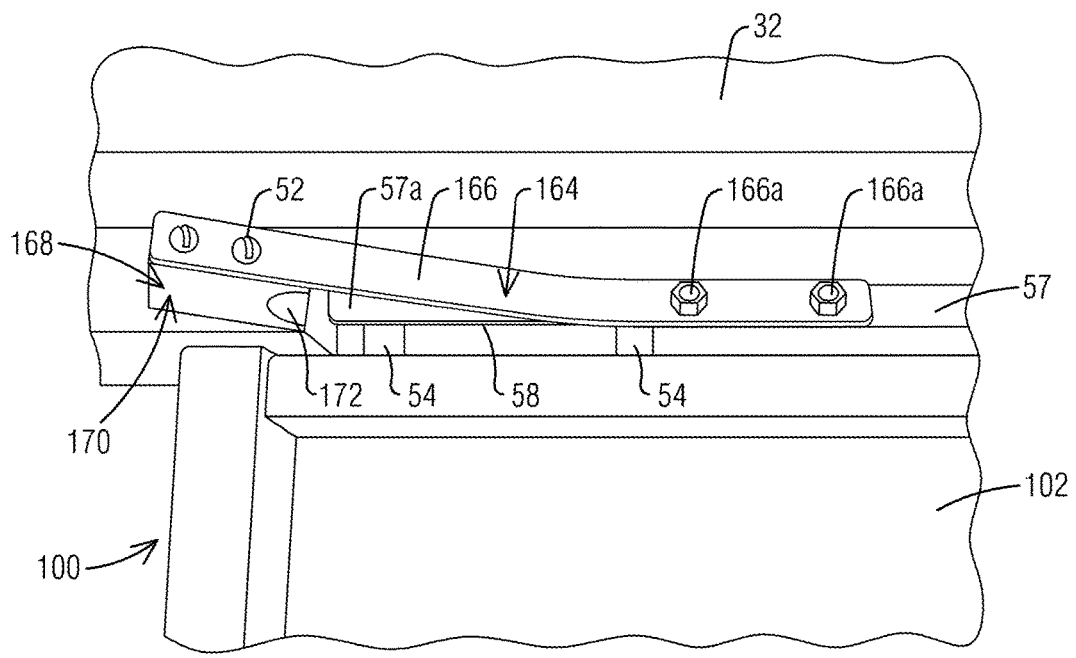
FIG. 14 is a partial view of the modules or panels of FIG. 13 in a closed position.
Figure 17:
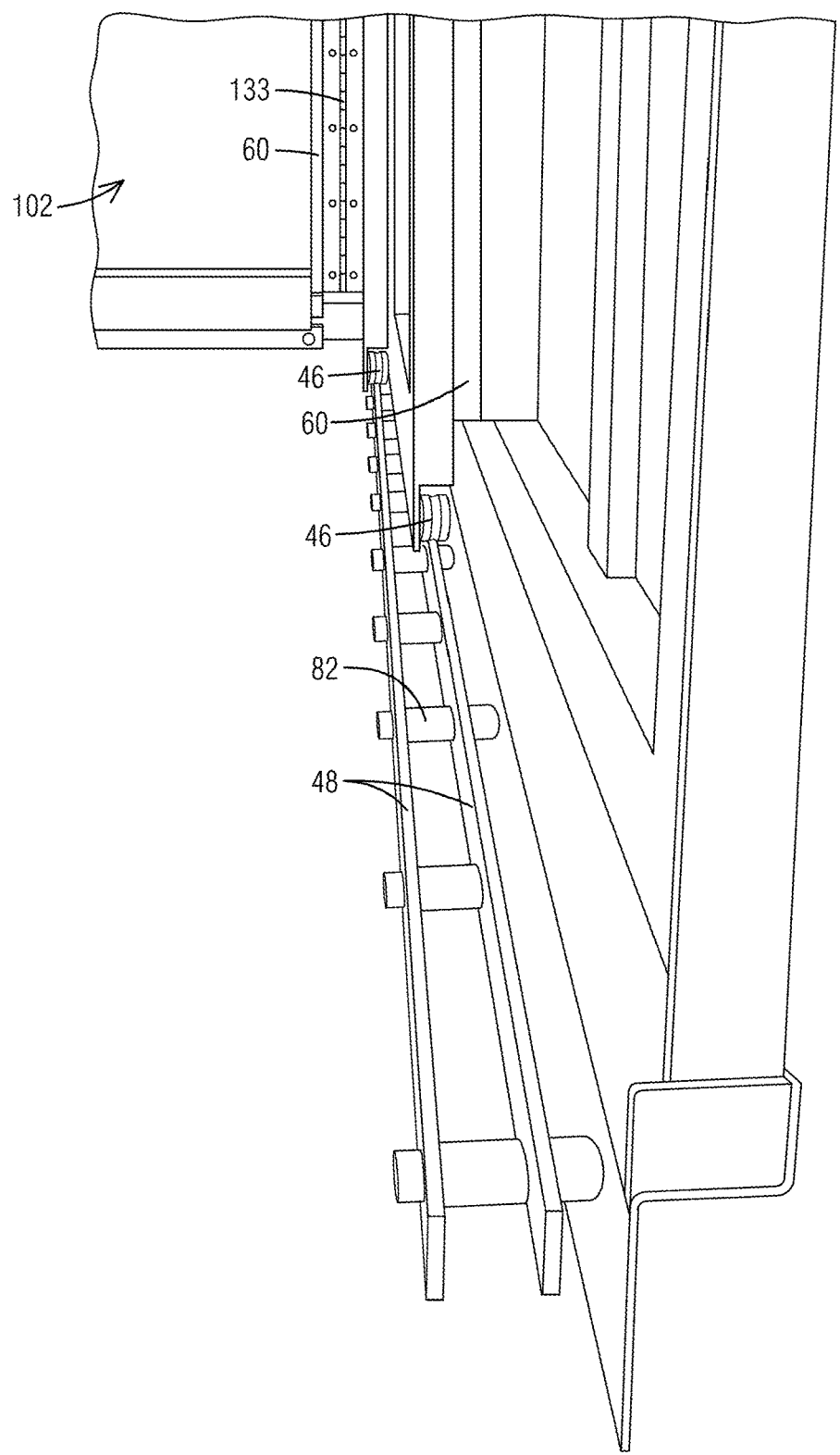
FIG. 17 is a partial view of modules or panels at least partially supported by a track or rails according to principles of this disclosure.

In one embodiment, as indicated in FIGS. 1 and 3-8, the modules 100 each can include one of more movable panels 130 that can be dimensioned, sized, shaped or otherwise configured to fit within one or more adjacent modules 100 and be at least partially slidable into or out of an interior of the body of the adjacent modules in a telescoping manner. In a further example, the modules can be arranged such that a front or rear sides of the modules are substantially opposed to, or abut, a rear or front side of one or more adjacent modules in a slidable relationship or configuration. For example, as shown in FIGS. 12 and 16, series of wheels or rollers 46 may be mounted or otherwise fixed to the modules or panels 100 and slidably mounted along a series of tracks or flanges 48 connected to one or more adjacent modules 100, frame supports, or supporting members of the machine, such as base 24, so that the modules are slidable along the tracks 48. In addition, or in the alternative, as shown in FIGS. 13-14, the modules 100 may include a series of cam assemblies 52 connected thereto, which may generally include a series of cam followers 54 movable/slidable within one or more positions or members having cam tracks 56 and mounted to, or otherwise fixed to, the frame supports, one or more adjacent modules, and/or the base of the machine. Embodiments of the present disclosure are not so limited, however, and the modules also may include slides, bearings, or any other mechanisms allowing sliding movement between adjacent modules 100 or along the frame supports 32 or base 24. The modules 100, or the panels 130 thereof, also can be fixed to one or more adjacent modules by a hinge or series of hinges 133 such that they are rotatable in relation to one another as generally shown in FIGS. 1-7.

Movement of the frame supports or beams 32 and/or modules 100 can generally be initiated by an operator of the machine. For example, the operator can push, pull, or otherwise actuate one or more levers, handles, grips, or pulls connected to, or other portions of, the frame supports or beams 32 and/or modules 100 to move, rotate, or slide the supports or beams 32 between different extended or retracted positions or arrangements of the modules 100 between a series of open and closed positions. In addition, with embodiments of the present disclosure, movement of the frame supports or beams 32, e.g., expansion, contraction, or repositioning of the frame supports or beams, and/or movement of the modules 100, e.g., rotation, sliding or other movement of the modules or panels between the open/closed positions, can be controlled, driven, or otherwise facilitated by one or more motors or other actuators in connected thereto. Such motors or actuators may move the frame supports/beams 32 or modules 100 between a series of arrangements, configurations, or positions in response to, or on the basis of, received packets, streams, or other control or electromagnetic signals generated by a controller, processor, or computer (CPU) in communication with, or otherwise connected to, the motors or actuators. This controller, processor or CPU can be operated by control panel 200 (FIG. 1). Further, the frame supports or beams 32 and modules 100 may include a series of locking or latching assemblies 23 connected thereto to hold or lock the frame supports/beams 32 and the modules 100 in place. In one example, the locks or latching assemblies 23 can be engaged or disengaged manually by an operator. Alternatively, these locking mechanisms can automatically lock or engage when the frame supports or beams and modules are moved between various arrangements or positions, such as by mechanical action or by actuation or movement of one or more of the motors or actuators.

Figure 7:
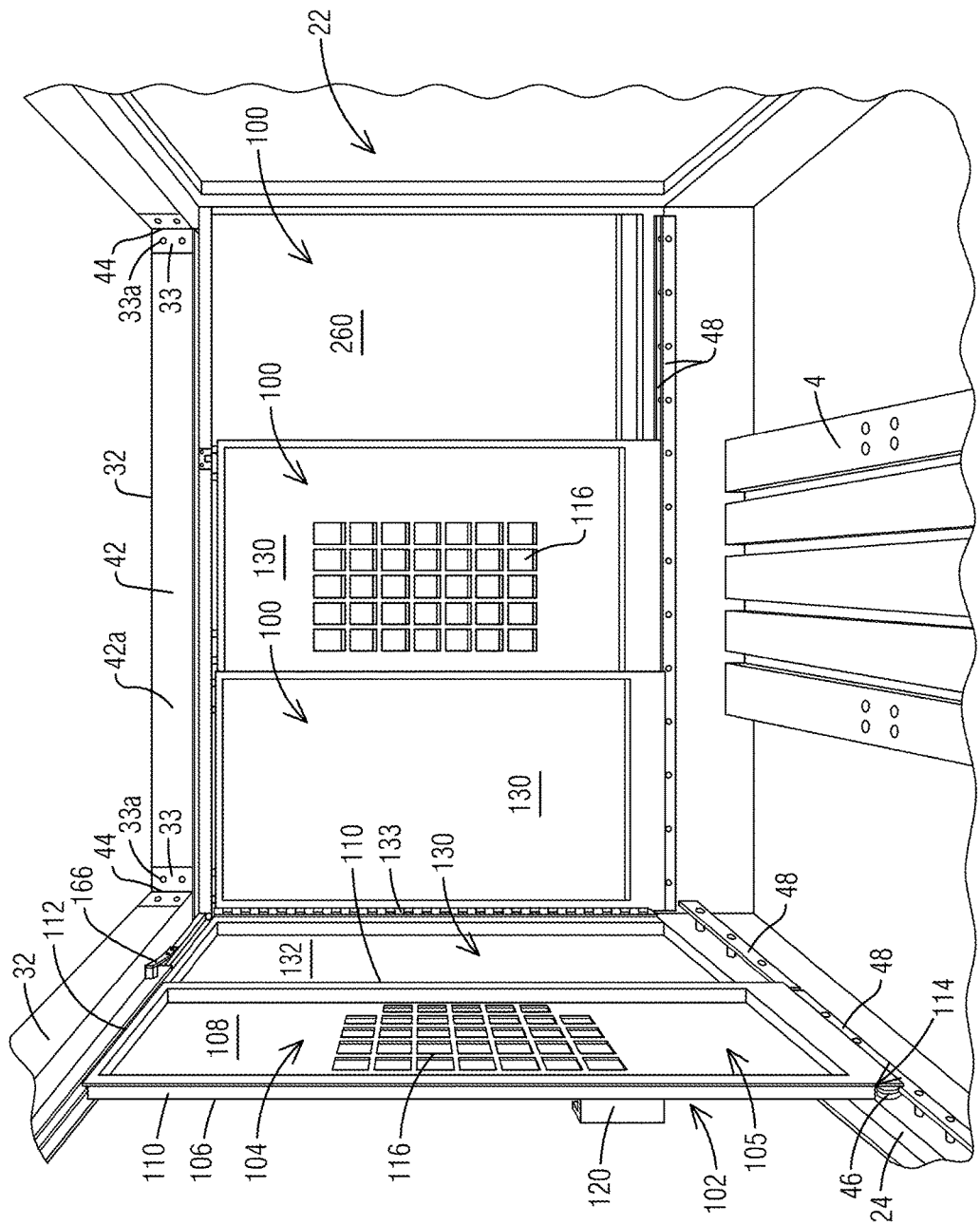
FIG. 7 is a perspective, interior view of the transformable enclosure according to FIG. 1, with the panels or modules in a closed position.
Figure 8:
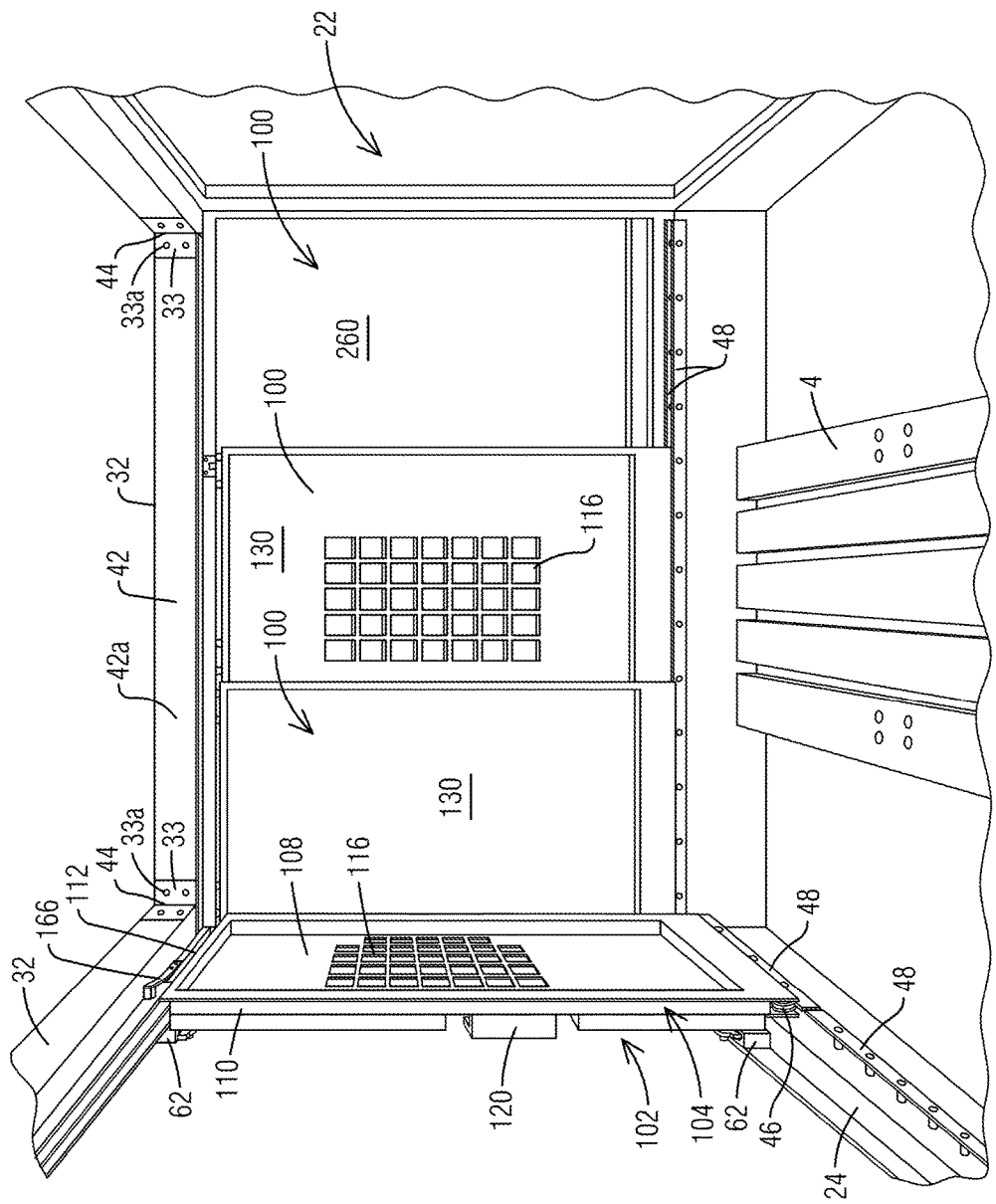
FIG. 8 is a perspective, interior view of the transformable enclosure of FIG. 1, with the panels or modules of the door assemblies in an open position.

As generally illustrated in FIGS. 1 and 7, the movable modules 100 may include one or more door assemblies 102, for example, including a pair of slidable door panels 104, or modules or sections 104 each having a body 105 (FIG. 7) with front 106, rear 108, side 110, top 112 and bottom 114 portions or sections. The door panels 104 may be movable/slidable toward and away from each other along the frame 12 between an open position (FIGS. 3 and 8) providing access to the interior 22 of the transformable enclosure 10, and a closed position (FIGS. 1 and 7) closing off the interior 22 of the enclosure. In one embodiment, as shown in FIG. 12, a series of wheels or rollers 46 (or other guiding members) may be mounted to the bottom portion 114 of the body 105 of the panels 104, so as to roll or otherwise move along a track or guideway 48 connected to the front portion 26 of the base 24 of the machine and/or one or more adjacent modules 100. The wheels or rollers 46 also can include a V-shaped notch or other recess 46b on an outer surface 46a thereof, and which can be configured to fit over and substantially receive at least a portion of the track 48 such that a recessed surface 46c of the wheels rests on, or is at least partially supported by, a top surface 48a of the track, and allowing the door panels 104 of the door assemblies to be at least partially supported by and movable along the track 48 (FIG. 12). Such a notched wheel/track assembly also may help retard or reduce side-to-side movement of the panels as they are moved between open and closed positions and also may reduce vibration of the door panels 104 or other modules 100 during operation of the machine. In addition, a top surface 48a of the track 48 further may include a series of detents, notches, dimples, or divots defined or formed therein, positioned along the track 48 to be engaged by and help ensure the panels of the door assemblies remain in an open or closed position until a sufficient force is applied by the operator to move or slide the pair of panels of the door assemblies toward and away from each other. The detents or divots can have a depth of about $1/32$ in. to about $1/8$ in., such as about $1/16$ in., though the depth of the detents is not limited thereto, however, and further may be dimensioned as needed for at least partially preventing unintended movement of the panels of the front door assemblies.

Additionally, or in the alternative, each of the door assemblies 102 further may include a series of projections or protruding members disposed on or attached to the door panels 104 that engage/interlock with one or more recesses defined in one or more adjacent modules 100, although other configurations a series of magnets and/or other releasable movement arresting may be mounted or otherwise disposed on panels 104 and/or adjacent modules 100 to hold the door panels 104 in open/closed positions until a sufficient force is applied thereto. One or more of the panels 104 further may include mechanically actuated latches or other locking mechanisms, which may engage with a corresponding feature of another one of the panels 104 to lock or secure the door panels 104 together in a closed position. Such a locking mechanism also may be engaged/disengaged by a mechanical lever, electronic switch, or one or more of the motors or actuators. The transformable enclosure still further can include one or more alert mechanisms, such as a light emitting diode (LED) or series of LEDs (not shown), which light up in a predefined sequence or with a specific color to indicate whether the door panels 104, or any other modules 100, are in the open or closed positions. Additionally, or in the alternative, one or more alert messages can be shown on the display 202 of the controller 200. The locking mechanisms and/or alert mechanisms also can be connected to, or otherwise in communication with, the one or more controllers, processors, or computers (CPU), such as being limited to a control of the machine tool to shut down operation upon detection of an alert or fault/unsecured condition.

As shown in FIG. 13, the slidable door panels 104 can include a series of cam assemblies 52 connected thereto, which may generally include cam followers 54 mounted to a series of cam flanges or rods fixed or otherwise connected to, e.g., by a faster, welding, or other suitable connection, a top surface 112a of the top portion 112 of the door panels 104, and these cam followers 54 may be movable/slidable within one or more cam tracks 56, which may be mounted, or otherwise fixed, to a front portion and/or top or rear portion of one or more adjacent modules or to at least a portion of one of the beams or supports 32. By way of example, the cam tracks 56 may include a U- or C-shaped members or portions with a pair of cam surfaces 58 for guiding the cam assemblies 52 and at least partially supporting and/or stabilizing the door panels 104 as they are moved between open and closed positions. The panels 104 of the door assemblies are not limited to this configuration, however, and may include, for example, a series of rollers or wheels mounted to the top surface 112a of the top portion 112 of the door panels 104, which may be movable/slidable about one or more tracks or flanges connected to the frame supports or beams and/or one or more adjacent modules.

The door assemblies 102 can further include a series of openings, apertures or windows 116 defined in the front 106 and rear portions of the door panels 104 through the panel body, allowing the operator to observe the operation of the automated machine tool, when the pair of door panels 104 are in a closed position (FIGS. 1, 4, and 7-8). These openings 116 typically include a transparent material housed therein, such as a transparent composite or reinforced glass, for example, the windows 116 can include one or more polycarbonate panels and/or sandwich polycarbonate panels, which include a polycarbonate panel disposed between pair of glass panels. However, embodiments of the present application are not limited to these materials and/or material configurations and may include any transparent material suitable for use with an automated machine tool.

FIGS. 3, 6, 8, and 12-13 further illustrate that, when the door panels 104 are slid or moved apart from each other to an open position, the front portion 106 of each of the door panels 104 of the door assemblies 102 may substantially oppose, or abut, a rear portion of one or more adjacent section modules 100, though embodiments of the present application are not limited to such an arrangement and the door panels 104 can be movable or slidable in a telescoping arrangement at least partially into and out of an interior of the body of one or more of the adjacent modules. The door panels 104 of the door assemblies 102 may further include a strip or series of sealing strips adhered or otherwise fixed to a surface of the front portion 106 of the panels to provide a seal between the door panels 104 and/or adjacent modules 100 and prevent coolant or lubricant used by the machine from exiting the enclosure and to further prevent particulates, chips, or other debris caused by machining from the machined part from getting between, and inhibiting movement of the door panels 104, adjacent modules 100 or frame supports 32. The strip or series of sealing strips may be made of rubber or other material resistant to corrosion caused by exposure to the coolant or lubricant dispersed by the cooling/lubricating assemblies. The panels of the door assemblies 102 and/or the adjacent modules 100 may further include one or more end stops, such as rubber end stops, arranged on the side portions 110 of the door panels 104 or flange portions connected thereto to at least partially absorb or dampen an impact of the panels and adjacent modules 100 when the panels 104 are moved/slid to their open or closed position.

Each of the door panels 104 of the door assembly 102 also may include one or more handles, grips or latches 120 fixed thereto so that an operator can apply the requisite force to initiate movement to move or slide the panels 104 between their open and closed positions as shown in FIGS. 1, 3 and 6-12. In one example, the handles, grips or latches 120 may be mounted to a surface 106a of the front portion 106 of the door panels 104 substantially adjacent to the side section 108 opposing the other one of the pair of panels (FIG. 1). Further, these latches or handles 120 can include an L-shaped handle (FIG. 1) but are not limited thereto and may include any other suitable handle, latch, pull, grip or other portion, such as allowing the tubular C-shaped handle operator to move or slide the door panels 104 between their open/closed positions.

The modules 100 generally may include panels 130 each having a panel body 132 with front 134, rear 136, side 138, top 140 and bottom 143 portions or sections. As shown in FIG. 3, a front surface 134a of the front section 134 of the modules may include a recess or notch 144 defined therein and dimensioned to receive the latches or handles 120 of the door panels 104 of the front door assemblies so that, when the door panels 104 are moved/slid to an open position, the latches or handles 120 are at least partially received or enclosed within recesses or notches. The panels 130 may be movable about the frame supports or beams 32 to an open position providing further, or variable, access to the interior 22 and the automated tooling machine or machine components housed therein (FIGS. 9 and 12). For example, as shown in FIG. 3, a hinge or series of hinges 133 can be connected to a rear portion 136 of selected ones of the panel bodies and a portion of an adjacent panel or module 100, which may be disposed perpendicularly thereto, so that the selected panels 130 are at least partially supported by the adjacent panel 100 in a manner so as to be rotatable between an open position in which the selected panels 130 are substantially parallel to the adjacent panels or modules 100, and a closed position in which the selected panels are substantially perpendicular to the adjacent panels (FIG. 12).

Further, one or more flanges or protrusions 62 (FIGS. 1-6 and 8) may be connected by a series of fasteners 64, or formed integrally with, the frame supports or beams 32, and these flanges or protrusions may include one or more block portions 66 fixed, such as by a series of fasteners, or otherwise connected thereto, with each of these block portions 66 having a block body 68 with front 70, side 72, top 74, bottom 76 and outside facing 78 portions or sections as shown in FIG. 15). An interior facing surface 70a of the portion 70 of the blocks (facing toward the inside of the machine) may include one or more rubber stops 80 for at least partially dampening or absorbing an impact between these stops and one or more flanges or protrusions fixed or otherwise connected to the top 140 and/or bottom surfaces of the modules 100 when the modules are moved to their closed position (FIG. 15), though rubber stops are provided, the present disclosure is not limited thereto, however, and may include stops of any material or composites, which are capable of at least partially dampening or absorbing impact between the flanges of the front side panels and block portions 66 connected to the beams or supports 32 and/or base 24.

FIGS. 1, 3-6, and 16 show that the modules 100 may include one or more latch or lever assemblies 148 disposed on the front surface 134a of the front portion 134 of the panels substantially adjacent to the top 140 and/or bottom 142 sections of the modules or panels 100. These latches assemblies 148 may include a latch body 150 with a protrusion or locking portion 152 and a latch or lever portion 154 extending therefrom, and the latch body may include an aperture 156 defined there through which receives a fastener 158 connecting the latch body to the front surface 134a of the front portion 134 of the panels 130 such that the latch assembly is rotatable or otherwise movable about this fastener as shown in FIG. 16. Accordingly, when the panels 130 are in a closed position, an operator may actuate or turn the lever portion 154 of the latch assemblies so that the locking portion 152 of the latch assemblies is at least partially disposed within a recess or notch 73 defined on a top surface of the block portions 66 connected to the frame supports or beams 32 and/or a surface of the bottom portion of the block portions 66 connected to the base 24 (FIG. 16) and thus adjacent panels 130/modules 100 can be locked or fixed in their closed position.

Moreover, when an operator actuates or turns the levers 154 to disengage or release the locking portions 152, the panels 130 may be free to slide or rotate so that the panels are movable to an open position (FIG. 4) where they abut, oppose or are substantially parallel to the panels 130 of one or more adjacent modules 100 disposed in or at least partially supported by the side section 16 of the transformable enclosure 10. The adjacent panels or modules further may also include one or more rubber stops or strips for damping and impact between the panels 130/104 and/or adjacent modules, and one or more mechanical latches that may lock or otherwise hold the panels 130 of adjacent modules/door assemblies in place, to define a selected enclosure configuration of one or more adjacent modules. In addition, seals or gaskets, disposed on rear portions of the panels, can be provided to further seal the transformable enclosure and help prevent chips, particulates or other debris from infiltrating and prohibiting movement of the panels 130, and/or the frame supports 32.

Figure 4:
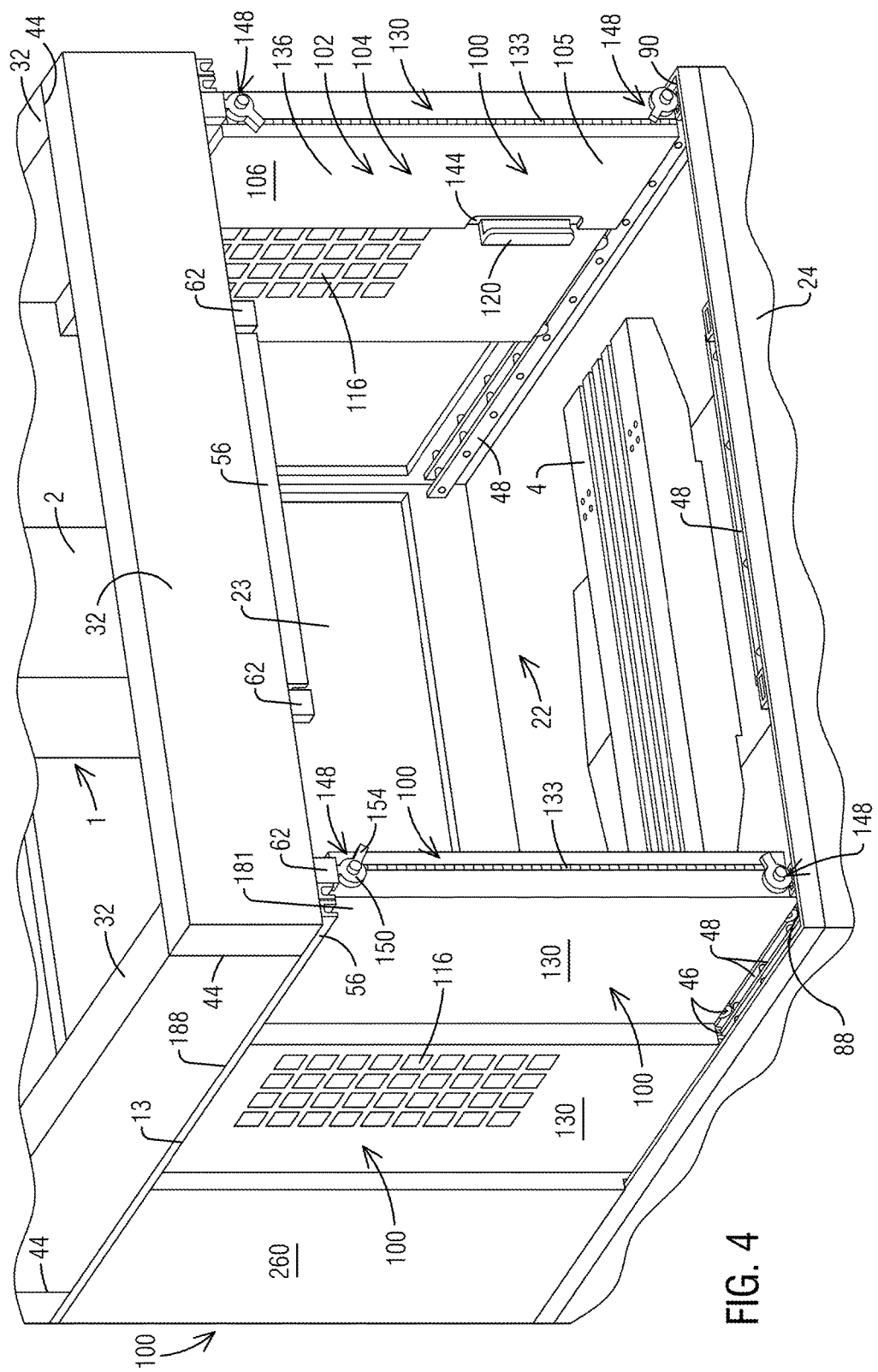
FIG. 4 is a perspective view of the transformable enclosure of FIG. 1, with the panels or modules of the door assemblies and adjacent panels or modules in an open position.
Figure 5:
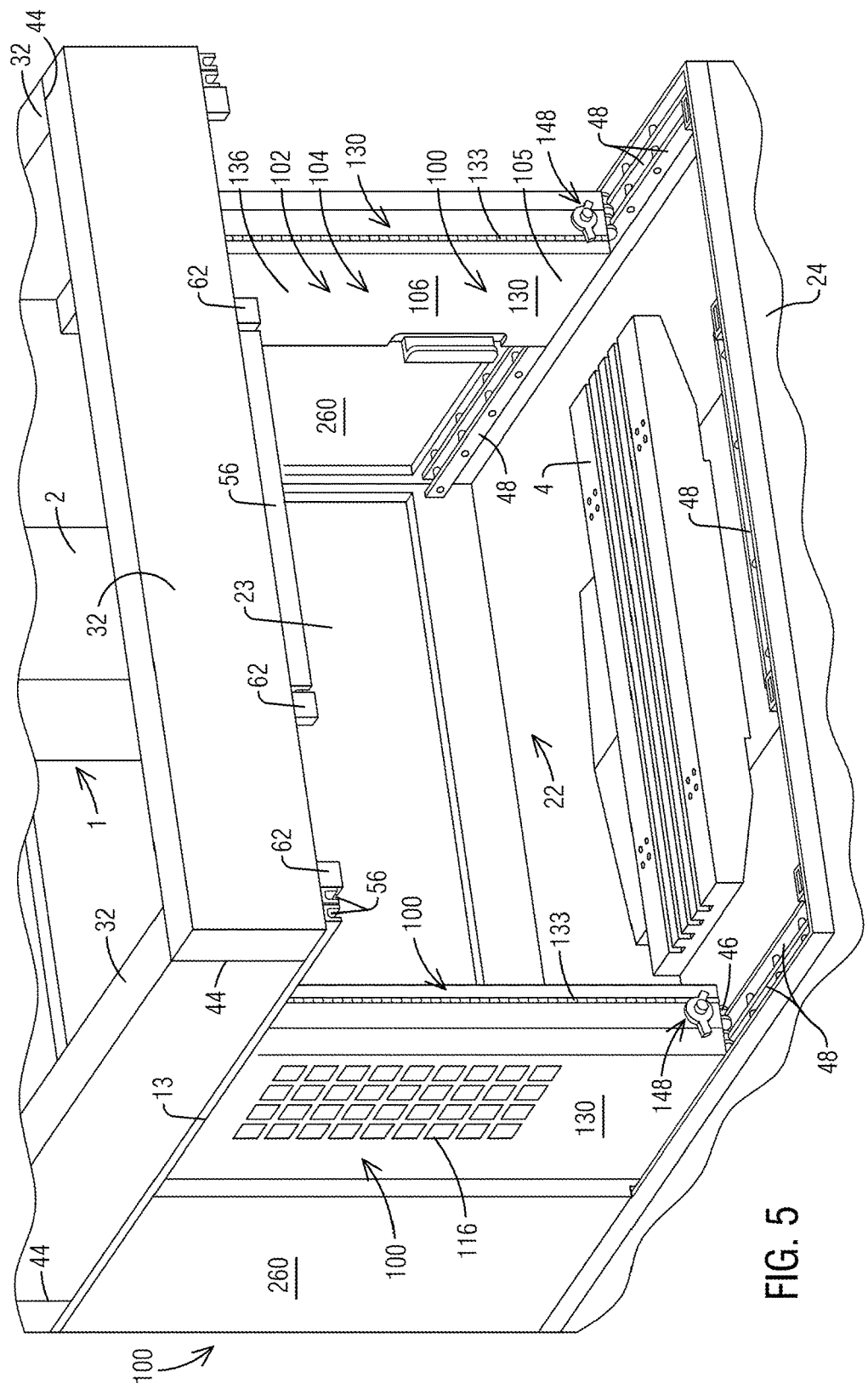
FIG. 5 is a perspective view of the transformable enclosure of FIG. 1, with the panels or modules of the door assemblies and additional adjacent panels or modules in another open position.
Figure 6:
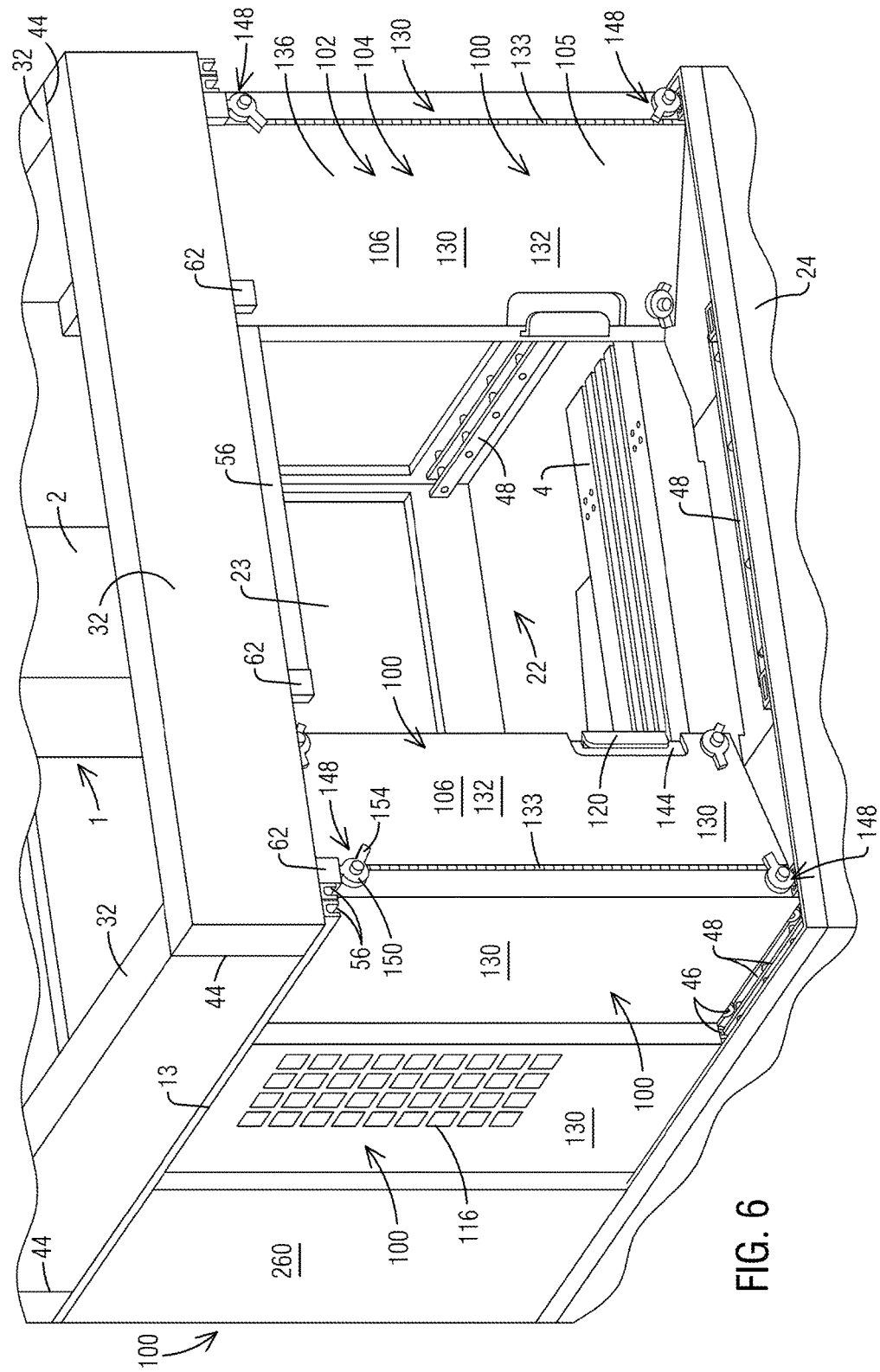
FIG. 6 is a perspective view of the transformable enclosure of FIG. 1, showing the panels or modules moving toward an open position.

In addition, as shown in FIG. 12, the panels 130 of the modules also can be connected to the one or more tracks or flanges 48, which support the wheel or roller assemblies 46 of the door panels 104 of the door assemblies, with one or more portions of these tracks/flanges substantially aligned with one or more portions of the tracks 48 connected to the panels 130, though this disclosure is not limited to this arrangement and can include telescoping panels/modules, slides or other suitable mechanisms, arrangements or configurations. As a result, when the panels 104 of the door assemblies are moved to the open position, their wheels or rollers 46 can be transferred to/from a portion of the tracks 48 fixed, or connected to, the base 24 or frame supports 32 onto the portion of the tracks 48a connected to/supported by the side panels 130. Moreover, FIGS. 13-14 show that the top portions 140 of the panels 130 can be connected to U- or C-shaped members 57 connected to the door panels 104 of the door assemblies so that, as the panels 104 of the door assemblies are moved toward their open position, the cam followers can be guided along the cam surfaces towards and through an opening or openings 57a of the members 57 connected to the panels 130. As a result, the panels 104 of the door assemblies can be at least partially supported by, and movable with, the panels 130, including being rotated together to an open position, so that they abut, oppose or are substantially parallel with adjacent modules 100 of the side portion 16 of the transformable enclosure. This arrangement/configuration can further provide an opening 23 spanning across a first 88 and second 90 end of the front portion of the transformable enclosure to allow for increased access to the interior 22 and the automated machine tool or the machine head housed therein as shown in FIG. 4.

As illustrated in FIGS. 13-14, the portions of the U-shaped or C-shaped members 57 connected to the panels 130 may further include a locking mechanism/assemblies 164, to secure the panels together and that connected or coupled panels do not move or slide apart from each other as additional ones of the panels 130/104 are moved/rotated between open and closed positions. For example, the locking assemblies 164 may include one or more stop portions 168 at least partially blocking or obstructing the opening 57a and holding the cam followers of the panels within the cam tracks 58 of the portions of the U- or C-shaped members 57, and/or one or more rods or bars 166 fixed or otherwise connected to a surface thereof, such as by one or more fasteners 166a, welding or other suitable connection, and a stop portion or portions 168 that may be fixed to an end portion of these rods or bars 166, e.g., by one or more fasteners, welding or other suitable connection. The stop mechanism(s) 168 can include a body 170 with a notch or recess 172 defined therein and can be arranged or disposed to substantially cover an opening 57a so as to engage or block movement of the cam followers and prevent them from exiting the cam surfaces of the U- or C-shaped members 57 connected to the panels 130.

Further, as shown in FIGS. 13-14, these stop mechanisms may be movable toward and away from their openings to prevent the panels 104 of the door assemblies from moving or sliding as a series of panels 104/130 are moved together to an open position, but can allow the cam followers to enter their openings when the panels 104 are to be moved between their closed and open positions. In one embodiment, the rods or bars 166 of the locking mechanisms/assemblies 164 may be made from a spring material, such as spring steel, or other resilient metal or material, and when the panels are moved or rotated to a closed position the body of each stop mechanism may impinge or contact a surface of the portions of the U- or C-shaped members 57 connected to the frame supports or beams 32, which can result in a deformation of the rod or bar 166 sufficient to move the stop mechanism away from its opening and allowing the cam followers to slide/move between the U- or C-shaped members 57 of the frame supports or beams 32 and the U- or C-shaped members 57 of the module panels 130, so that the panels 104 of the door assemblies are at least partially supported by the panels 130 when they are moved towards their open position.

In addition, the door panels 104 and/or panels 130 also may include one or more latch/locking assemblies 276 for securing adjacent panels 104/130 to fixed side panels, indicated at 260, in this open position as shown in FIG. 11. For example, the one or more latch/locking assemblies 276 may include a body 278 with an aperture opening 280 defined therethrough for receiving a fastener 282 to connect the locking assemblies 276 to a portion of a fixed top cam guide rail at a position substantially adjacent to a top portion thereof. The latch/locking assemblies 276 may include a lever 284 and a locking protrusion or projection 286, so that the operator can actuate or move the lever 284 to bring the locking protrusion 286 in contact with a notch 288 of a plate or other flange portion connected to frame supports or beams 32 of the transformable enclosure, to lock the movable modules, including panels 104/130, in an open position (FIG. 11). This open position allows for increased or further access to the interior 22 of the transformable enclosure and the tools/components of the automated machine tool housed therein.

According to embodiments of the present application, the transformable enclosure can be opened and closed quickly and efficiently, without requiring any specialized tools. For example, if all the modules or panels 100 of the enclosure are in closed positions, the operator can slide open the door panels 104 of the door assemblies until they hit a soft rubber end stop. Next, the operator can unlatch top and bottom latches 148 of a selected panel 130 that secure it to the enclosure, and pivot the panel or panels 104/130 until they make contact with a bumper, whereupon the assembly may latch to the inside wall of a third panel 130, forming a three panel assembly. The operator can then unlatch the top and bottom latches 148 securing the third panel 130 to the enclosure, and slide the panel assembly until it makes contact with a fourth panel 130 for forming a four panel assembly. All four panels can then be slid behind panel 260 which can be fixed to the enclosure or machine structure. After all of the four coupled panels reach the end of travel, they can make contact with another rubber stop to cushion or dampen the impact. With all panels 104/130 stowed adjacent or behind the fixed panel 260, the operator can latch one or more of their top latches to rigidly secure all four panels, and repeat the same steps on the other side of the machine. To close the enclosure the operator simply reverses the sequence of the steps outlined above. In the closed configuration bottom and side junctions of all enclosure panels may be sealed with rubber seals and compressible gaskets to prevent the coolant from leaking outside the machine. This ability to transform the machine enclosure from fully enclosed to fully opened can be beneficial for small to medium size machine shops where cost of the equipment and floor space are often the two main considerations.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. It therefore will be understood by those skilled in the art that while the present invention has been described above with reference to preferred embodiments, numerous variations, modifications, and additions can be made thereto without departing from the spirit and scope of the present invention as set forth in the following claims. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed is:

1. A transformable enclosure for an automated machine, comprising:
    a plurality of supports selectively connectable in series to define an enclosure frame of a selected size, shape, and/or configuration, the enclosure frame comprising front, rear, and side sections that at least partially define an interior chamber that at least partially receives the automated machine therein;
    openings defined along the enclosure frame for providing access to the interior chamber and the automated machine; and
    a plurality of modules at least partially supported by and movable along the supports between a closed position closing the openings for substantially closing off the interior chamber during operation of the automated machine and a series of open positions at least partially uncovering one or more openings of the openings for providing varying levels of access to the interior chamber during operation of the automated machine, while substantially reducing escape of and/or exposure to debris or particulates generated by the operation of the automated machine from the enclosure frame,
    wherein the plurality of modules are slidable and/or rotatable along selected supports of the plurality of supports to define varying enclosure configurations and/or to vary the size of the openings along the enclosure frame.

2. The transformable enclosure of claim 1, wherein the supports are coupled together at a series of joints to define a substantially stable, fixed structure.

3. The transformable enclosure of claim 1, further comprising locking mechanisms operable to secure the supports and/or the modules in various positions or arrangements for defining the varying enclosure configurations.

4. The transformable enclosure of claim 1, wherein the automated machine is a CNC machine.

5. The transformable enclosure of claim 1, wherein the modules and the supports are formed from a substantially high-strength, rigid material.

6. The transformable enclosure of claim 1, wherein one or more modules of the plurality of modules are transferrable between two or more of the plurality of the supports.

7. The transformable enclosure of claim 1, wherein at least one module of the plurality of modules comprises a roller assembly comprising rollers that engage one or more tracks arranged along one or more supports of the plurality of supports of the enclosure frame so that the at least one module is slidable along the one or more supports of the enclosure frame.

8. The transformable enclosure of claim 7, wherein the at least one module is slidable onto a track at least partially supported by an adjacent module of the plurality of modules so that the at least one module is supported by the adjacent module.

9. The transformable enclosure of claim 8, wherein the adjacent module further comprises a hinged connection connecting the adjacent module to at least one additional module of the plurality of modules so as to enable rotation of the adjacent module and the at least one module supported thereby in a vertical or horizontal direction with respect to the one or more supports.

10. The transformable enclosure of claim 1, further comprising at least one locking mechanism for arresting movement of each module in relation to adjacent modules.

11. An automated machine assembly, comprising:
    an automated machine tool;
    a reconfigurable enclosure structure selectively configurable for housing the automated machine tool, comprising:
        a plurality of supports connected together at a series of joints to at least partially define a frame at least partially defining an interior of the reconfigurable enclosure structure; and
        a plurality of selectively movable panels at least partially supported by and movable about the plurality of supports,
    wherein the automated machine tool is at least partially housed within the interior of the reconfigurable enclosure structure, and the plurality of selectively moveable panels are slidable and/or rotatable about the plurality of supports between a series of open positions to provide varying levels of access to the automated machine tool and a fully closed position substantially sealing off the interior of the reconfigurable enclosure structure, and wherein when one or more selectively movable panels of the plurality of selectively moveable panels are in one of the open positions, at least one operation of the automated machine tool is altered.

12. The reconfigurable structure of claim 11, wherein the plurality of selectively moveable panels includes one or more panels that are slidable along one or more of the supports.

13. The reconfigurable structure of claim 12, wherein the one or more slidable panels include a series of rollers attached thereto that are movable about a track connected to the frame or one or more adjacent panels.

14. The reconfigurable structure of claim 12, wherein the one or more slidable panels include cam assemblies having cam followers that are movable about a cam track connected to the frame or one or more adjacent panels.

15. The reconfigurable structure of claim 11, wherein the plurality of selectively moveable panels includes one or more panels that are pivotally attached to adjacent selectively moveable panels of the plurality of selectively moveable panels so as to be rotatable about one or more of the supports.

16. The reconfigurable structure of claim 11, wherein at least one selectively moveable panel of the plurality of selectively moveable panels is at least partially supported by an adjacent selectively moveable panel of the plurality of selectively moveable panels.

17. The reconfigurable structure of claim 11, wherein sets of supports of the plurality of supports comprise telescoping beams to allow the frame to be formed with various shapes, dimensions, arrangements, and/or configurations.

18. The transformable enclosure of claim 11, wherein the plurality of selectively movable panels comprises:
at least one door panel having a roller assembly attached thereto and comprising rollers configured to engage at least one track arranged along at least one support of the plurality of supports so that the at least one door panel is slidable therealong;
at least one adjacent panel positioned adjacent to the at least one door panel and having at least one track attached thereto configured to be engaged by the rollers of the at least one door panel, wherein the at least one track of the at least one adjacent panel is configured to be at least partially aligned with the at least one track of the at least one support such that the at least one door panel is slidable so as to be supported by the at least one adjacent panel; and
at least one additional panel connected to the at least one adjacent panel at a hinged connection that enables rotation of the at least one adjacent panel, and the at least one door panel supported thereby, with respect to the at least one support, wherein the at least one additional panel has a roller assembly attached thereto and comprising rollers configured to engage at least one additional track arranged along at least one additional support of the plurality of supports arranged adjacent the at least one support so that the at least one additional panel, the at least one adjacent panel, and the at least one door panel are slidable along that at least one additional support.

19. A method for forming a transformable machine enclosure enabling variable access to an automated machine at least partially located within the transformable machine enclosure, comprising:
connecting a series of supports together to define a substantially stable enclosure with front, rear, and side sections that at least partially define an interior chamber that at least partially receives and encloses the automated machine therein;
positioning a plurality of panels along the supports, with the panels moveable between a series of open positions and a substantially closed position, wherein the series of open positions provide varying levels of access to the automated machine during operation thereof and the substantially closed position substantially closes off the interior to substantially reduce escape of or exposure to debris or particulates generated from operation of the automated machine;
selectively moving one or more of the panels to their open position as needed to access the automated machine; and
when one or more panels are moved to their open position, modifying at least one operation of one or more components of the automated machine during operation thereof.

20. The method of claim 19, further comprising reducing or stopping a flow of a fluid of a coolant and/or lubrication assembly of the automated machine while the automated machine is in operation, when the one or more panels are moved to their open position.

* * * * *